United States Patent
Sweet et al.

(10) Patent No.: US 11,501,039 B2
(45) Date of Patent: *Nov. 15, 2022

(54) OPTIMIZING AIRCRAFT FLOWS AT AIRPORTS USING DATA DRIVEN PREDICTED CAPABILITIES

(71) Applicant: Architecture Technology Corporation, Minneapolis, MN (US)

(72) Inventors: Douglas Sweet, Saratoga, CA (US); Sebastian Timar, Santa Cruz, CA (US); Matthew Stillerman, Ithaca, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 277 days.

This patent is subject to a terminal disclaimer.

(21) Appl. No.: 17/012,332

(22) Filed: Sep. 4, 2020

(65) Prior Publication Data

US 2021/0133370 A1    May 6, 2021

Related U.S. Application Data

(63) Continuation of application No. 15/671,170, filed on Aug. 8, 2017, now Pat. No. 10,783,288.

(51) Int. Cl.
*G06F 17/10* (2006.01)
*G06F 30/20* (2020.01)
*G06F 17/18* (2006.01)
*G06F 111/10* (2020.01)

(52) U.S. Cl.
CPC .............. *G06F 30/20* (2020.01); *G06F 17/18* (2013.01); *G06F 2111/10* (2020.01)

(58) Field of Classification Search
CPC ................................ G06F 30/20; G06F 17/18
USPC ............................................................ 703/2
See application file for complete search history.

(56) References Cited

U.S. PATENT DOCUMENTS

| | | | |
|---|---|---|---|
| 2003/0078913 A1* | 4/2003 | McGreevy | G06F 16/2462 |
| 2014/0195077 A1* | 7/2014 | Johnsen | B64D 45/04 |
| | | | 701/16 |
| 2015/0298817 A1* | 10/2015 | Jackson | G05D 1/0083 |
| | | | 701/3 |

* cited by examiner

*Primary Examiner* — Andre Pierre Louis

(57) ABSTRACT

A method for safe and efficient use of airport runway capacity includes receiving, at an air traffic control system at an airport, airport data related to movement areas of the airport, time data related to a time period, aircraft data related to a plurality of aircraft expected to operate into and out of the airport during the time period, and environmental data related to environmental conditions predicted for the airport during the time period. The method further includes computing a probability distribution for inter-aircraft spacing by applying the airport data, the time data, the aircraft data, and the environmental data to a trained Bayesian network, producing the probability distribution for the inter-aircraft spacing as an output observation of the trained Bayesian network, and, using the probability distribution and a confidence value, identifying an inter-aircraft spacing value for the plurality of aircraft expected to operate into and out of the airport during the time period.

20 Claims, 28 Drawing Sheets

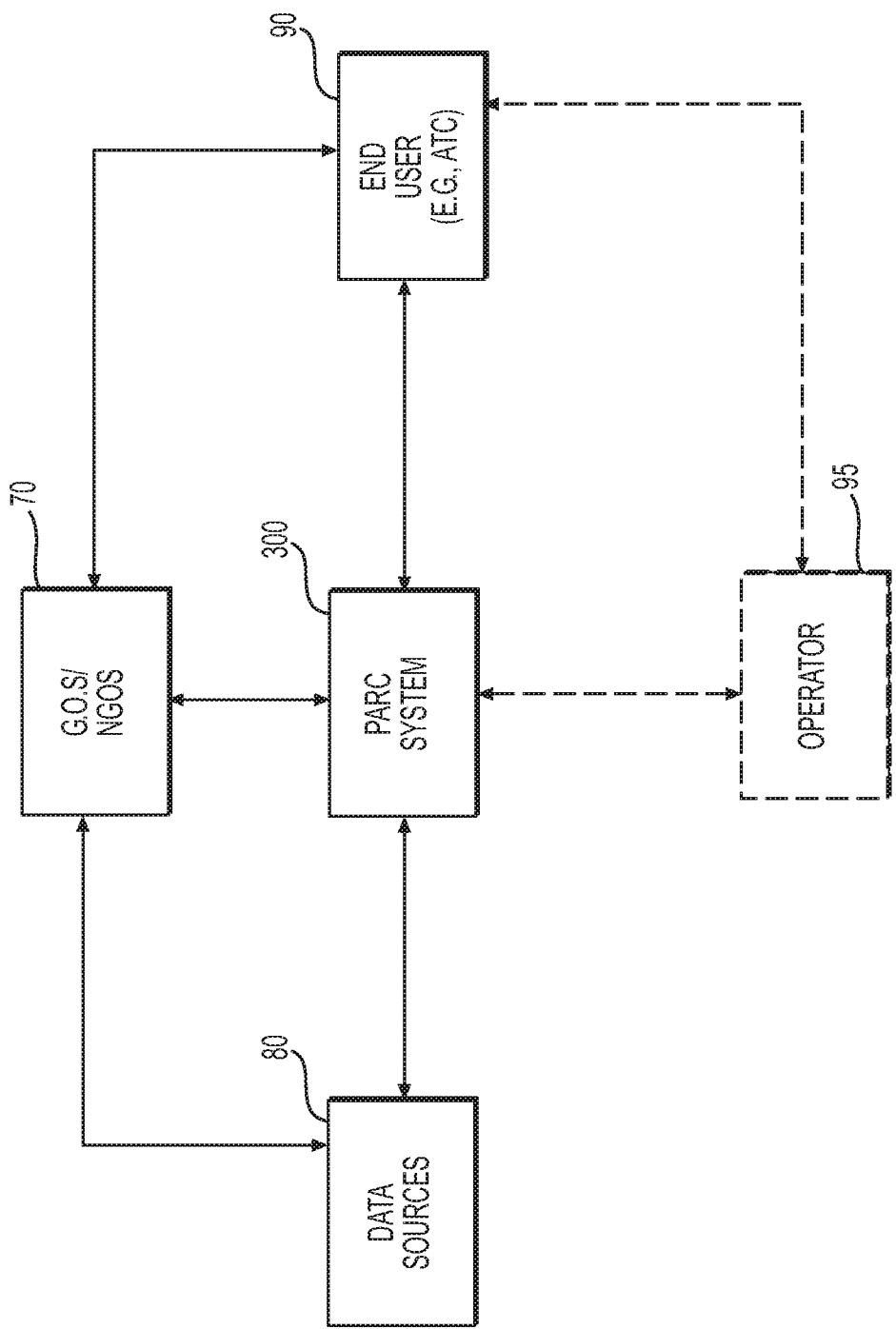

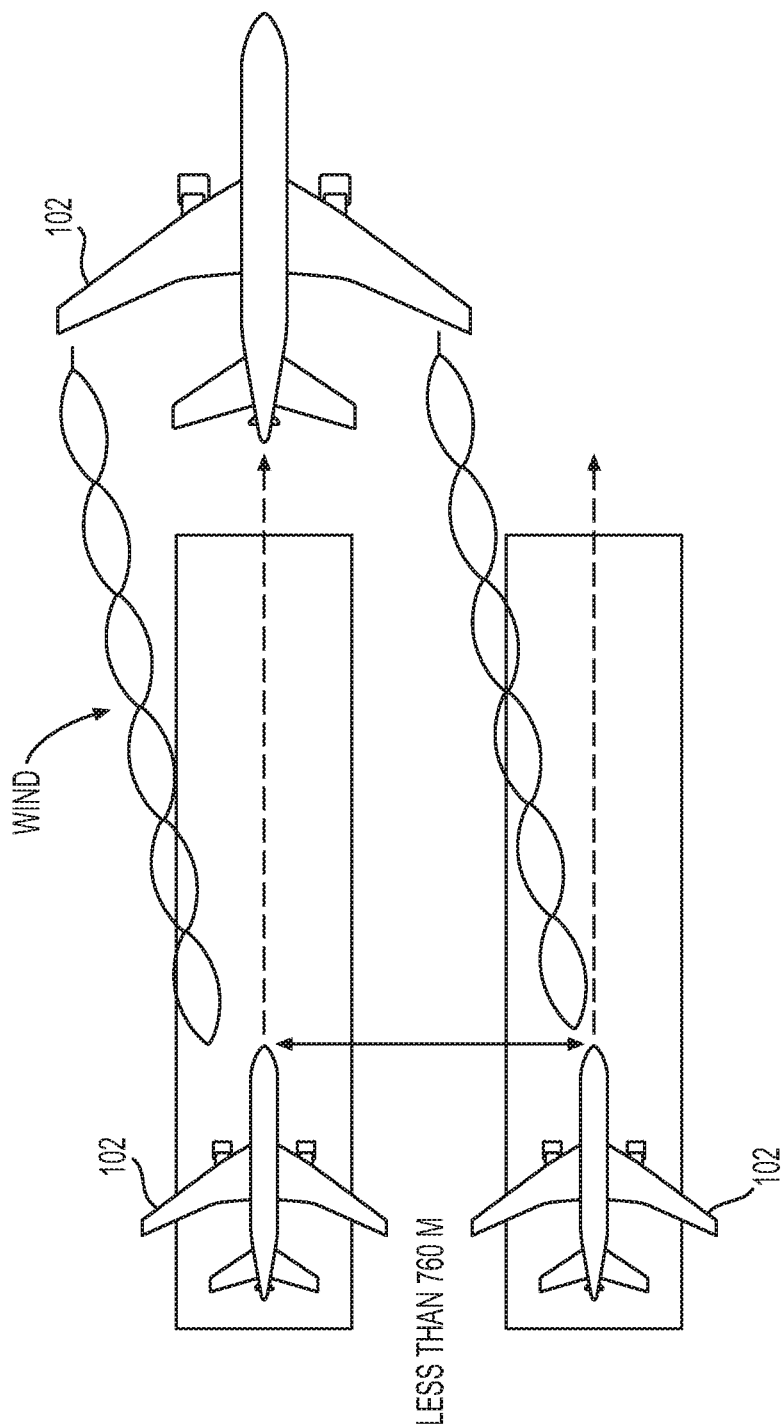

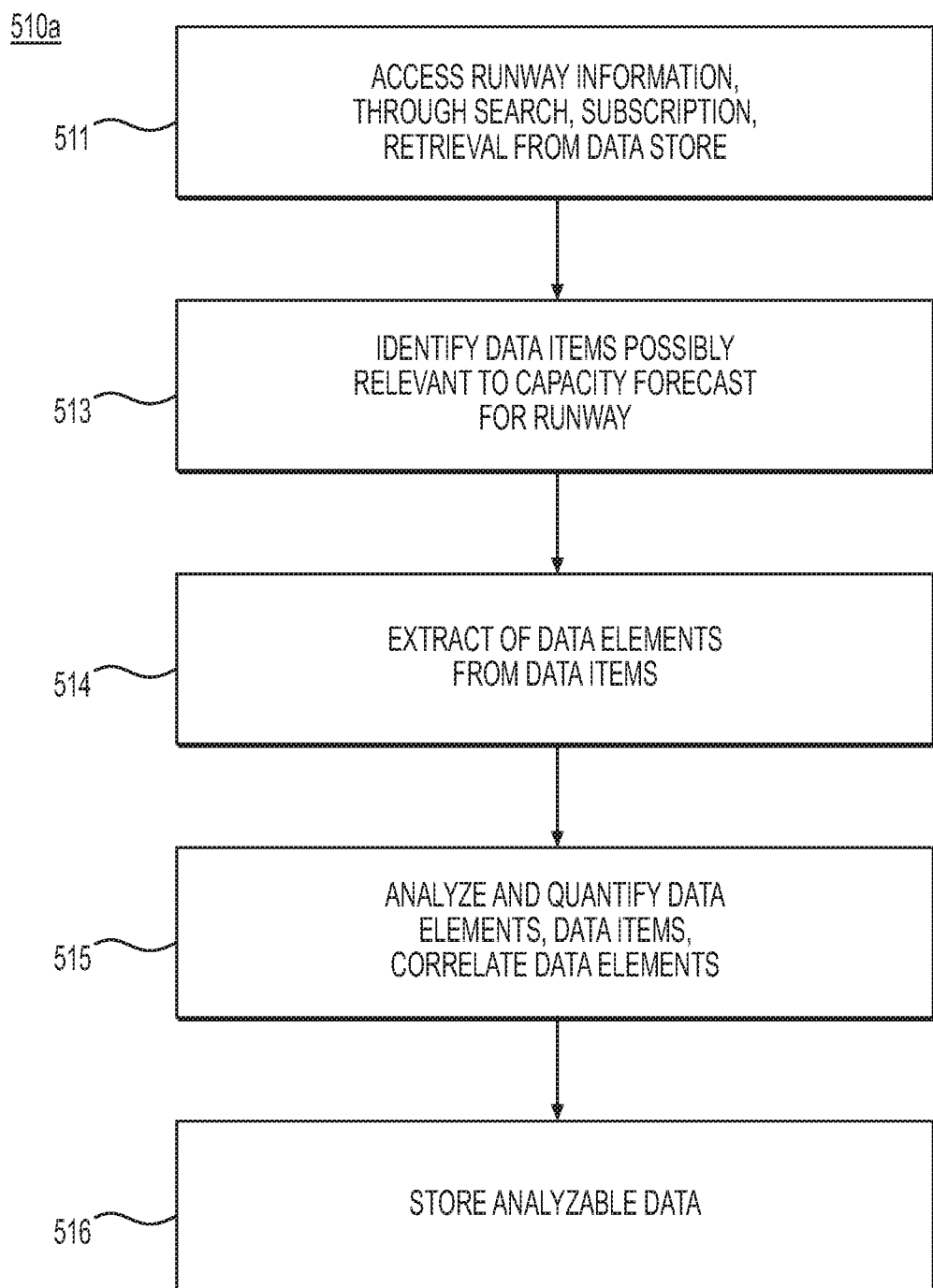
FIG. 5B (1)

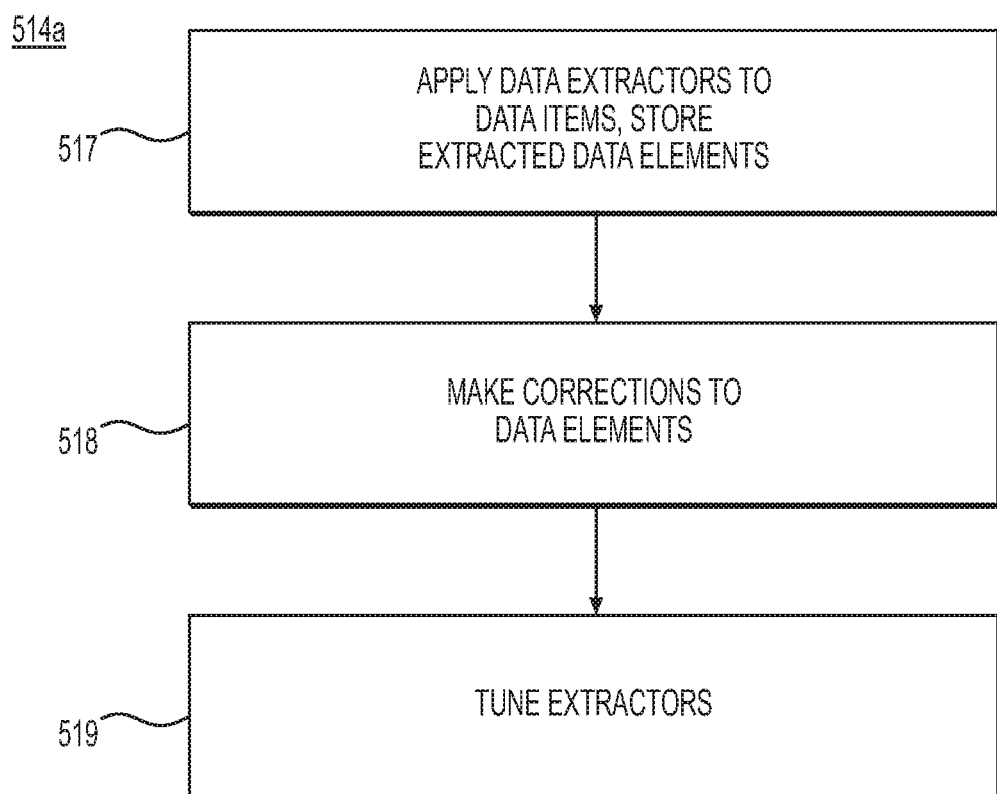
FIG. 5B (2)

OPTIMIZING AIRCRAFT FLOWS AT AIRPORTS USING DATA DRIVEN PREDICTED CAPABILITIES

RELATED APPLICATIONS

This application is a continuation of U.S. patent application Ser. No. 15/671,170 filed Aug. 8, 2017, entitled "System and Method for Predicting Aircraft Runway Capacity," the disclosure of which is incorporated by reference.

STATEMENT OF FEDERALLY SPONSORED RESEARCH

This invention was made with government support under NNX17CL38P and 80NSSC18C0036 awarded by the National Aeronautics and Space Administration (NASA). The U.S. government may have certain rights to the invention.

BACKGROUND

Machine movement control may be important in some situations to ensure both safe operation and efficient operation. For example, maintaining adequate spacing between machines operating on a set pathway is necessary to avoid collisions and maintain a safe operating environment. At the same time, if the spacing is too large, pathway utilization (efficiency) may be impaired.

One specific example of machine movement control in which both safety and efficiency are of concern involves movement of aircraft on runways, and more specifically, takeoff and landing of aircraft. Estimates of arrival and departure capacities of individual airport runways may be used to predict occurrences of demand-capacity imbalance, and to meter arrival and departure demand to match runway capacity. Inaccurate capacity estimates may result in incorrectly identified periods of demand-capacity imbalance. Incorrectly identified periods of demand-capacity imbalance may, in turn, lead to unnecessary traffic metering, the lack of traffic metering when it is needed, underutilized runways, and/or excessive traffic congestion.

As an example, forecast weather near an airport may indicate a change in the prevailing wind direction, ceiling, and Runway Visual Range (RVR), thereby requiring changing the airport runway configuration from a South Flow to a North Flow and a change to the operational flight rules from visual to marginal. Traffic managers may want to know if these changes could reduce runway capacity and result in sufficient traffic congestion to warrant application of departure metering. However, systems do not exist to accurately predict a need for such metering. Simply imposing set inter-aircraft spacing may either starve the runway of flights or create excessive runway departure queues.

SUMMARY

A method for safe and efficient use of airport runway capacity includes receiving, at an air traffic control system at an airport, airport data related to movement areas of the airport, time data related to a time period, aircraft data related to a plurality of aircraft expected to operate into and out of the airport during the time period, and environmental data related to environmental conditions predicted for the airport during the time period. The method further includes computing a probability distribution for inter-aircraft spacing by applying the airport data, the time data, the aircraft data, and the environmental data to a trained Bayesian network, producing the probability distribution for the inter-aircraft spacing as an output observation of the trained Bayesian network, and, using the probability distribution and a confidence value, identifying an inter-aircraft spacing value for the plurality of aircraft expected to operate into and out of the airport during the time period.

A runway capacity forecast system includes machine instructions stored in a non-transitory computer readable storage medium, the machine instructions, when executed, causing a processor to access data items related to a runway of interest for a time horizon of interest, the data items comprising environment factors for the runway of interest and the time horizon of interest, flight operation factors, and aircraft performance factors for aircraft scheduled on the runway of interest and during the time horizon of interest; extract data elements from the data items; reformat the data elements as analyzable data elements and store the analyzable data elements in an analyzable data structure; apply a probabilistic model to selected ones of the analyzable data elements to provide a forecast runway capacity for the runway of interest during the time horizon of interest the first product; and using the forecast runway capacity, determine one or more impacts based on the forecast capacity.

A runway capacity forecast method includes a processor obtaining information related to a runway of interest for a time horizon of interest; the processor determining a probability distribution for a single measure of runway capacity based on the obtained information; using the probability distribution, the processor executing a simulation of runway utilization to produce expected values of the single measure; the processor accessing a scheduled demand for the runway of interest and the time horizon of interest and comparing an expected value of the single measure with the scheduled demand; providing a notification that the scheduled demand exceeds the expected value, and furnishing the expected value to traffic control systems to meter traffic demand to the expected value.

A runway capacity forecast system includes machine instructions stored in a non-transitory computer readable storage medium. When executed, the machine instructions cause a processor to access data relative to conditions and operations at a runway of interest and a time horizon of interest; generate probabilistic distributions of a measure of runway capacity using the accessed data; run simulations over the breath of possible aircraft sequences and the measure of runway capacity (inter-aircraft spacing values) to determine a distribution of possible capacities for the runway of interest and a time horizon of interest; select a measure of runway capacity from the distribution of possible capacities; compare the selected measure with a scheduled demand for the runway of interest and the time horizon of interest; provide an alert that the scheduled demand exceeds the selected measure, and furnish the selected measure to traffic control systems to meter traffic demand to satisfy the selected measure.

DESCRIPTION OF THE DRAWINGS

The detailed description refers to the following figures in which like numerals refer to like items, and in which:

FIG. 1F illustrates an example environment in which a system for predicting aircraft runway capacity may operate;

FIGS. 2B-2F illustrate example environments in which an example aircraft movement control system may be implemented;

FIGS. 5A-5E illustrate example methods executed by the system and components of FIGS. 3B, 3D-3G and 4A-4D.

DETAILED DESCRIPTION

Machine movement control may be important in some situations to ensure safe and efficient operation. For example, maintaining adequate spacing between machines operating on a set pathway may be necessary to avoid collisions. At the same time, if the spacing is too large, efficiency may be impaired.

Figure 1A:
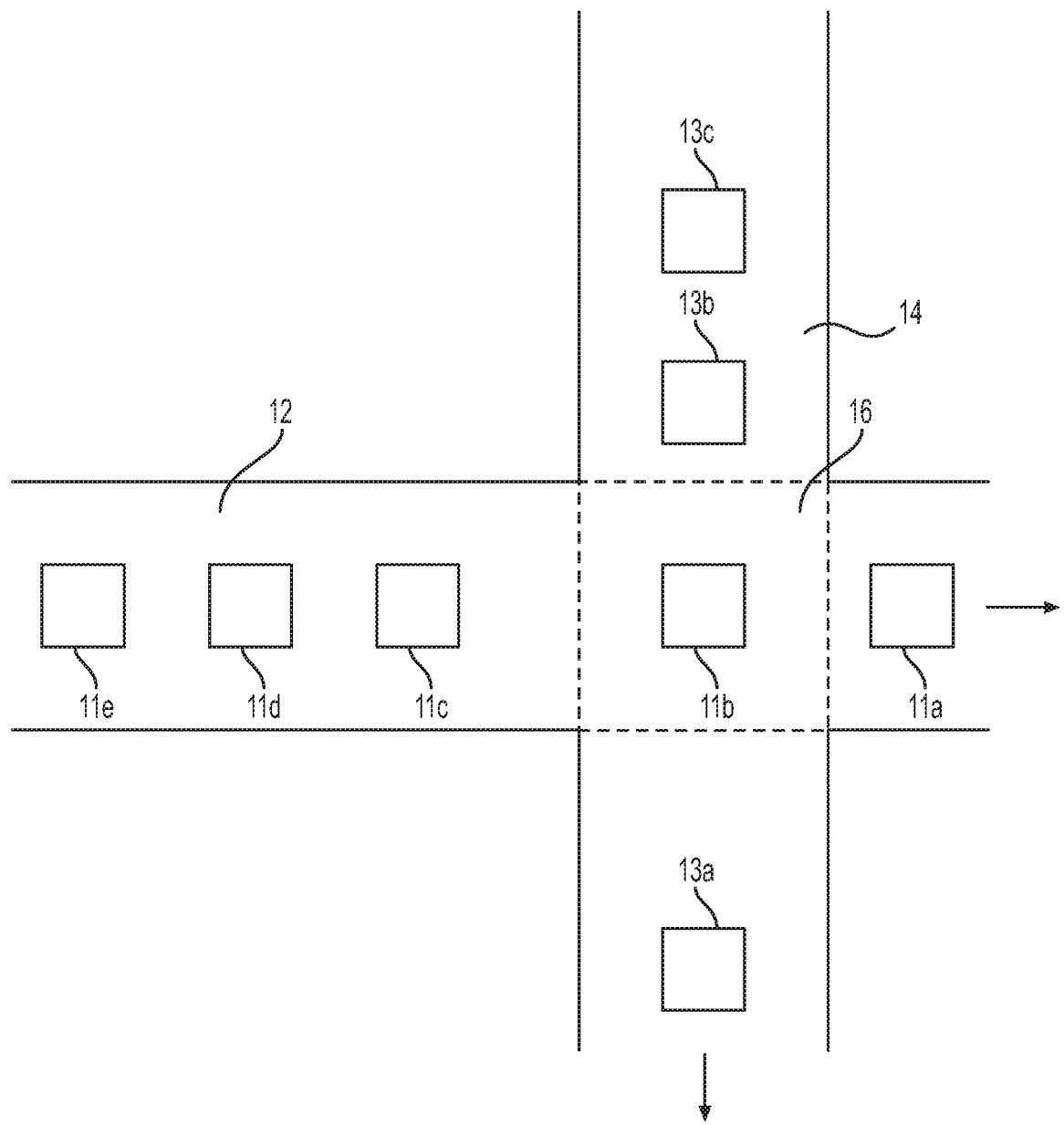
FIGS. 1A and 1B illustrate example concepts for controlling machine movement.

FIG. 1A illustrates an example concept for controlling machine movement. In FIG. 1A, machines $11i$ and $13i$ operate, respectively, on pathways 12 and 14, which can be seen to cross at intersection 16. The machines $11i$ and $13i$ may be identical or may differ in some minor or material ways. Clearly, a potential exists for collision of the machines $11i$ and $13i$ in the intersection 16. Prior art systems exist that may be employed to control the machines $11i$ and $13i$ to prevent a collision. For example, some prior art systems employ RFID technology to read a RFID tag on a machine and to pass control instructions to individual machines. One aspect of machine movement may be a desire to maximize throughput (i.e., movement through the intersection 16).

Prior art systems for machine control tend to be reactive, rather than predictive, with the effect that traffic movement cannot be easily adjusted (metered) to compensate for changing conditions, including changing environment conditions. For example, in FIG. 1A, the machines $11i$ and $13i$ may be affected by temperature, wind, and humidity. A prior art RFID-based system cannot make traffic flow adjustments in advance, or dynamically ("on-the-fly") as environment conditions change.

In FIG. 1A, other factors could affect efficiency of machine movement. For example, the machines $13i$ may have, temporarily, a more important mission than the machines $11i$. Thus, the machines $13i$ may need priority access to intersection 16 for a limited time. Such priority access could affect the mission of machines $11i$. A prior art RFID-based control system does not easily accommodate such a change in circumstances. These limitations make prior art machine control systems inefficient, and possibly ineffective or inappropriate for certain scenarios, environments, or applications.

Figure 1B:
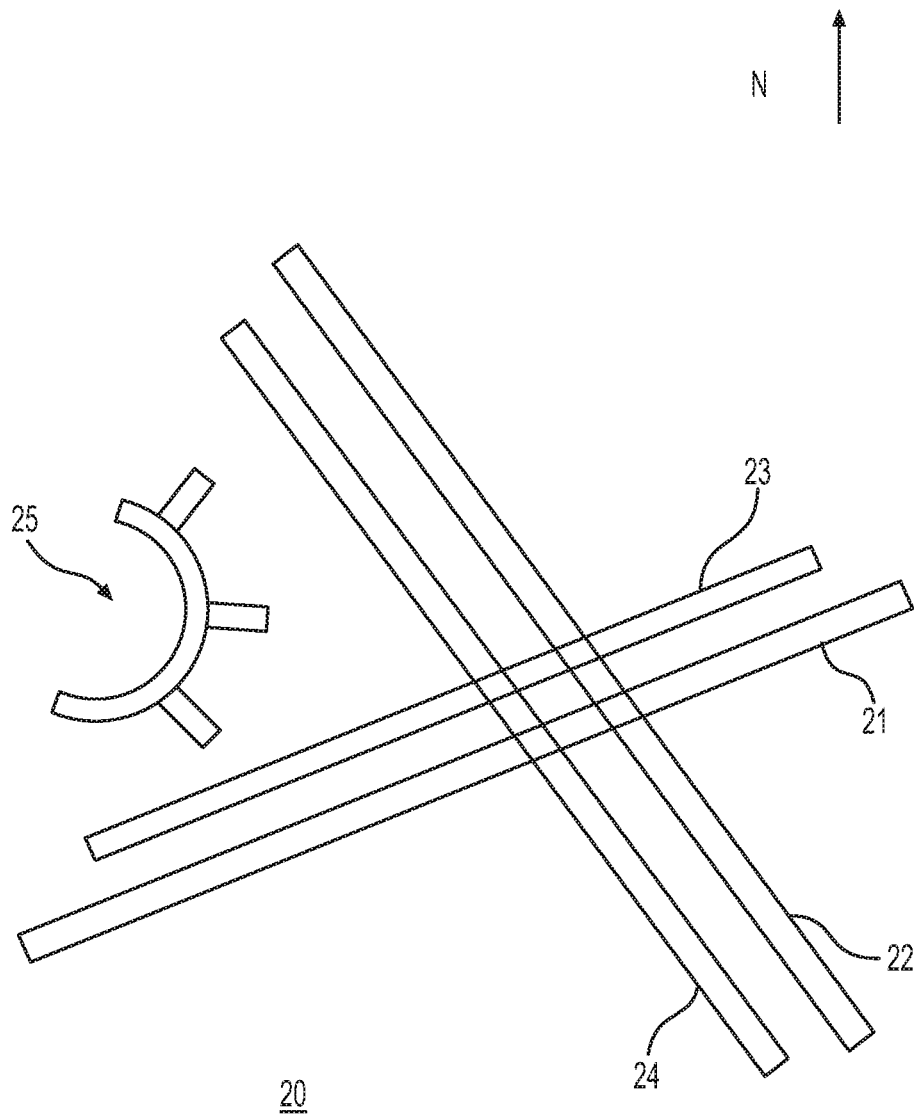

One specific example of machine movement control in which both safety and efficiency are of concern involves movement of aircraft on runways, including takeoff (departure) and landing (arrival) of aircraft. FIG. 1B illustrates an example airport 20 with terminal 25 and crossing runways 21-24. Safety considerations may dictate some minimal spacing between aircraft using the same runway, or using crossing runways. Perhaps not so obvious is that aircraft using parallel runways also may interfere with each other, and hence also may require a minimal spacing. For example, aircraft departing on runway 24 may require spacing with respect to aircraft on runway 22. However, if aircraft spacing is too large (for example too much time between takeoffs), runway utilization efficiency, and runway capacity may degrade—sometimes referred to as "starving the runway." At airports such as airport 20, estimates of arrival and departure capacities of individual airport runways may be used to predict occurrences of demand-capacity imbalance, and to meter arrival and departure demand to match runway capacities. Inaccurate estimates may incorrectly identify periods of demand-capacity imbalance, and traffic metering, resulting in underutilized runways or excessive traffic congestion.

Figure 1C:
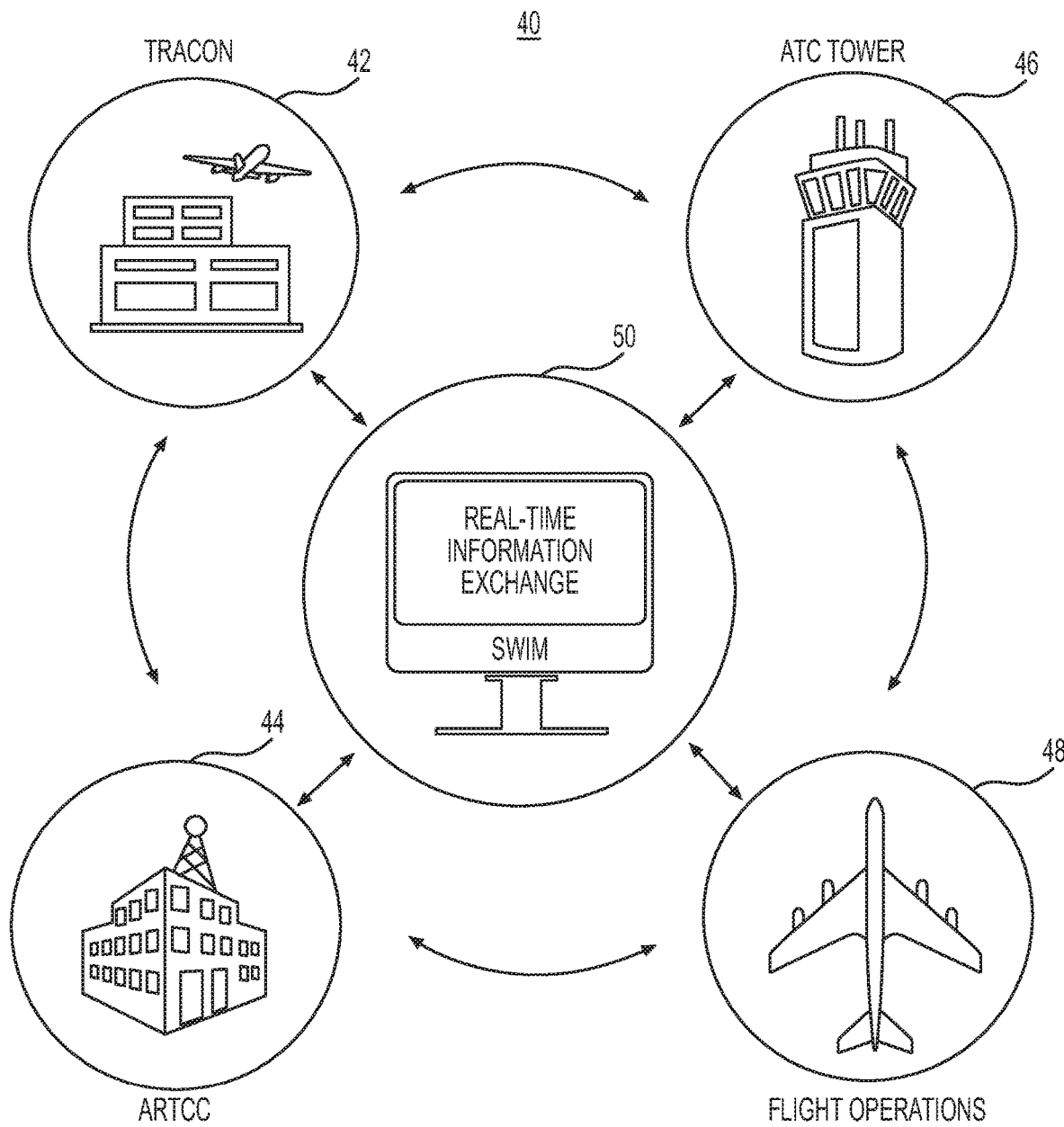
FIG. 1C illustrates an example of aircraft flight control entities.

Balancing airport traffic demand with runway capacity avoids excessive traffic congestion, flight delays and flight inefficiency, while maximizing throughput consistent with safety. Several entities may monitor and control aspects of aircraft movement from gate pushback to departure, en-route (inter-airport routing), and arrival. FIG. 1C illustrates a network 40 of certain of these entities as currently existing in the U.S. National Airspace System (NAS), including Terminal Radar Approach Control (TRACON) 42, Air Route Traffic Control Center (ARTCC) 44, Air Traffic Control (ATC) Tower 46, and Flight Operators 48, all in communication with information exchange System Wide Information Management (SWIM) 50. Flight Operators 48 may control aircraft in an airport's non-movement areas (for example, ramp areas and terminal gates), ATC Tower 46 may control aircraft in the airport's movement areas (taxiways and runways). TRACON 42 and ARTCC 44 may control aircraft en-route. Historically, these entities used the concept of Miles in Trail (MIT) to provide en-route separation of aircraft. More recently, the Federal Aviation Administration (FAA) began adopting Time Based Flow Management (TBFM) for this purpose, with TBFM deployed at 20 en-route air traffic control centers to adjust terminal airspace arrival times by speeding up or slowing down aircraft while they are still hundreds of miles from their destination airports.

For departures, the FAA's Surface Collaborative Decision Making (CDM) Concept of Operations proposes departure management programs to meter departing aircraft to match the departure capacity of the airport's runways. This proposal may be far from implementation.

Figure 1D:
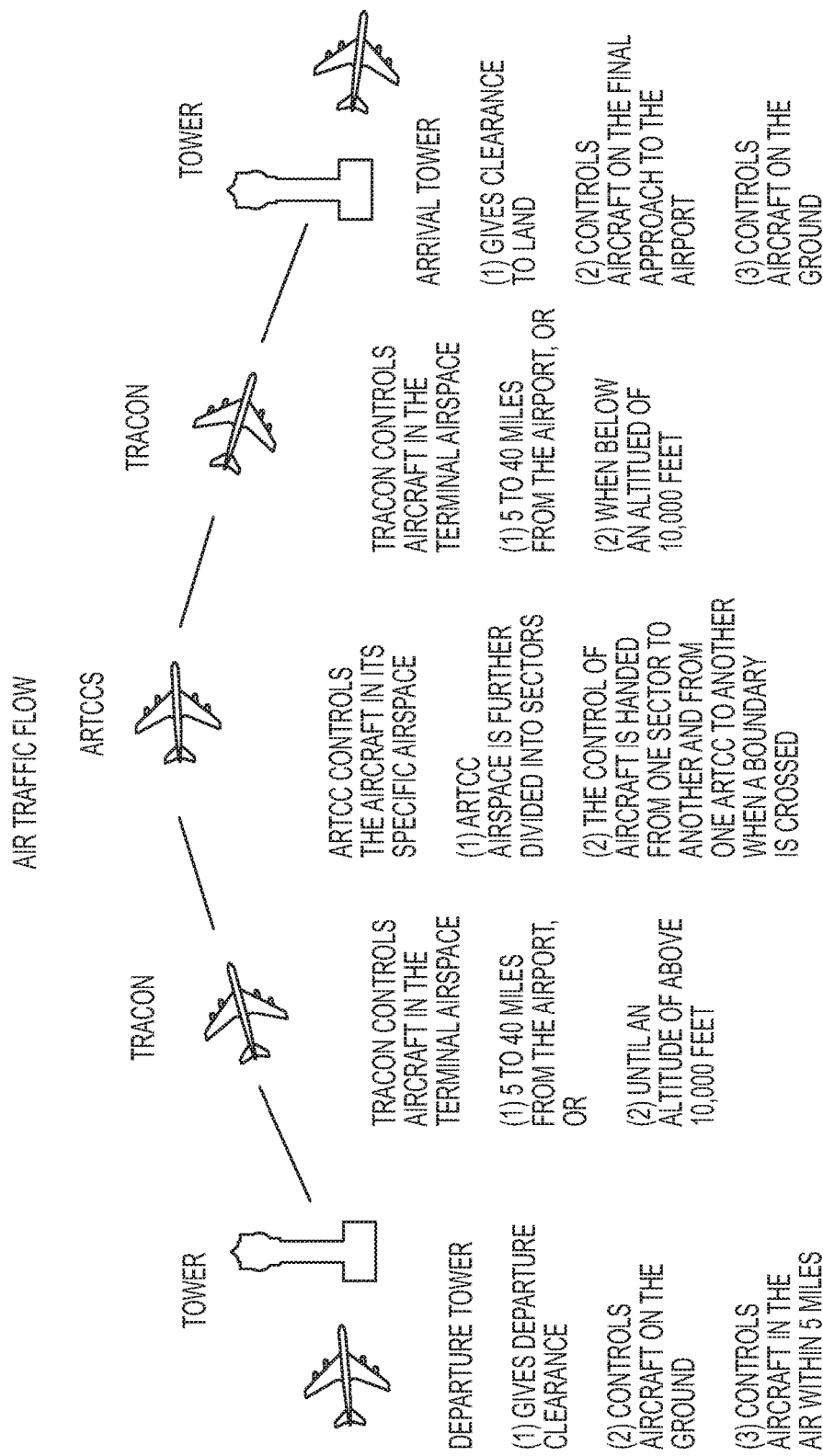
FIG. 1D illustrates air traffic control functions of the entities of FIG. 1C.

FIG. 1D illustrates air traffic control functions by the entities of FIG. 1C. As can be seen in FIG. 1D, ATC Tower controls the movement areas of an airport.

Each of the programs and systems currently in use by the entities of FIG. 1C suffer from certain drawbacks. For example, aircraft control may be predicated on a surveillance system that is expensive to implement throughout the NAS. In addition, adoption of some systems and programs may be optional, may take decades to complete, and may become obsolete rapidly. Moreover, the programs and systems do not address runway capacity and runway safety in a holistic manner; i.e., the programs and systems do not effectively consider the totality of factors affecting runway capacity and furthermore do not consider the effects of the interactions among the factors on runway capacity.

Figure 1E:
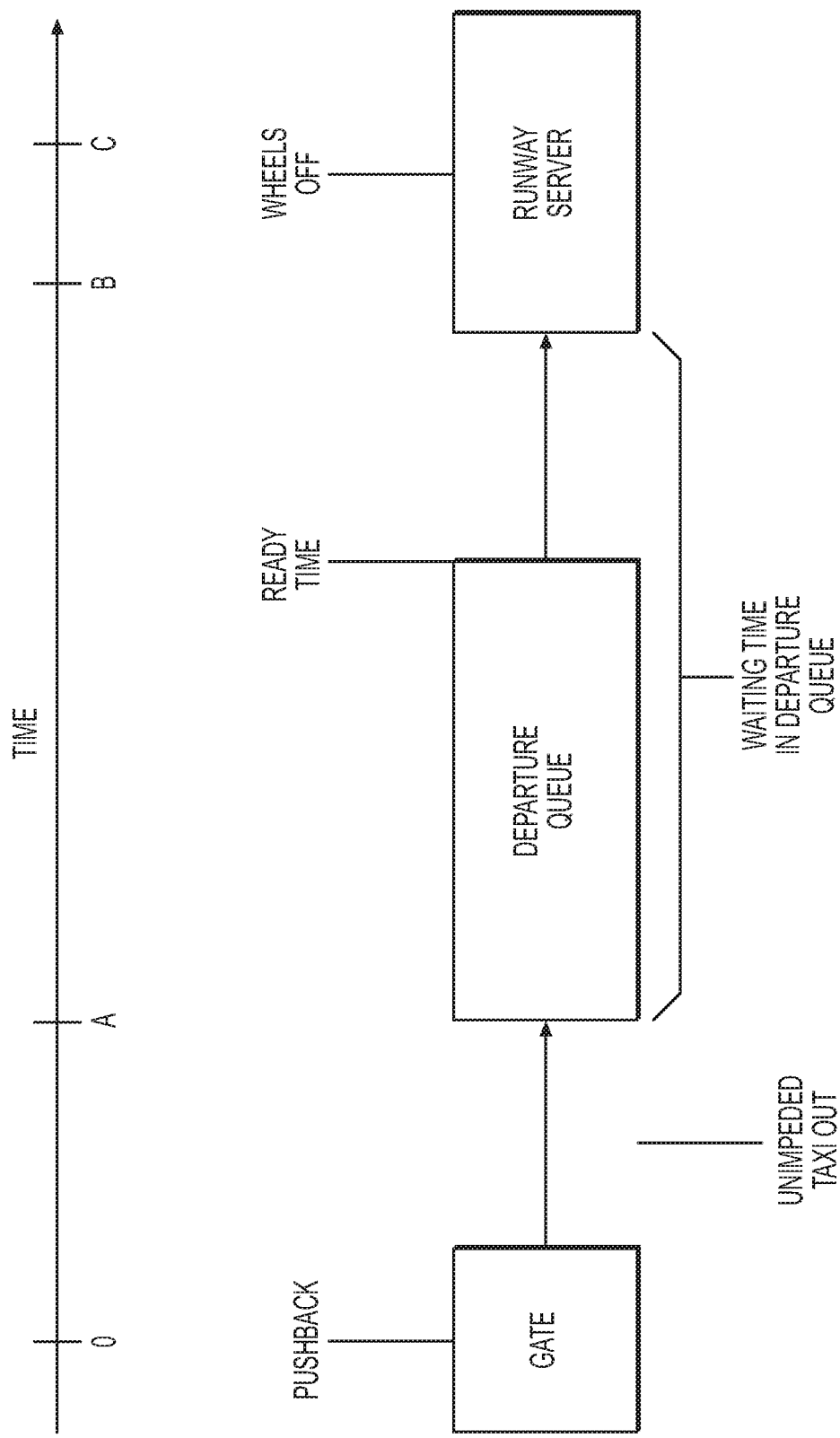
FIG. 1E illustrates a customer-server model that illustrates aircraft departure queueing.

One way to view runway capacity is through a queueing model. FIG. 1E presents a customer-server model that illustrates aircraft departure queueing. In FIG. 1E, an aircraft is initially parked at a gate. At time 0, the aircraft pushes back from the gate and operates in the airport's non-movement area during un-impeded taxi out time 0-A. At time A, the aircraft enters a departure queue, and from time A to time B waits in queue, ready for takeoff. At time B, the aircraft is "served," or enters a "runway server system"—meaning the aircraft begins a takeoff roll that ends at time C with wheels off (i.e., the point at which an aircraft's wheels leave the ground). The aircraft remains in the "runway server system" until the aircraft reaches a specified departure point. The time "in queue" for the aircraft may be estimated using queueing models.

However, application of such a customer-server queueing model will not produce results that account for the variability of the many factors that affect aircraft movement. Traditionally, airport departures are managed on a first-come/first-served basis. Aircraft taxi out and take their place in the queue to be sequenced for takeoff. But when demand exceeds capacity, the result can be long departure waits, surface congestion, expensive fuel burn, and gate holdouts.

FIG. 1F presents an environment in which a herein disclosed prediction of airport runway capacity (PARC) system 300 may function. In FIG. 1F, environment 60 includes many government organizations and non-government organizations 70 that have an interest in safe and efficient aircraft operation in the NAS. The organizations 70 may provide and/or may access data sources 80. The organizations 70 may communicate with end users 90. The end users 90 include any of the entities shown in FIG. 1C. To enhance aircraft safety and efficiency, the organizations 70 and the end users 90 may use the PARC system 300. In an embodiment, the PARC system 300 may be operated by one of the entities of FIG. 1C. Alternately, the PARC system 300 may be operated by a separate operator 95.

Fundamental to demand-capacity balancing is accurately estimating the arrival and departure throughput that each runway can sustain; that is, the capacity of each runway. Estimated runway capacity is the basis for predicting periods of excess arrival or departure traffic congestion, and for metering arrivals and departures to manage traffic congestion. For traffic planning and management, the PARC system 300 may specify the runway capacity as a single value in terms of aircraft per hour over a period, such as, for example, one hour or 15 minutes. However, the capacity of a runway depends on many factors, including the configuration of the airport's runways (e.g., closely-spaced, crossing, converging), the weight classes of aircraft using the runways (which may be defined by the FAA or the International Commercial Aviation Organization (ICAO); e.g., the ICAO weight classes of Small, Medium, Heavy (including 757), and Super (A380)) and their required separations, visibility conditions of the airport (e.g., visual, marginal or instrument), and inter-aircraft spacing precision that controllers and pilots can realize, and other factors. One additional consideration relates to the use of multiple factors—namely the possibility that two or more such factors may correlate. Unexpected correlation between random variables may signal a bias in the data set that can skew the statistical model. Correlation is also helpful in identifying outliers in the historical data set that should be removed before model generation. When a statistical model includes, jointly, some variables that are highly correlated, it might be no more accurate, as a predictor of other variables, than a similar model that excludes some of the correlated variables. In an embodiment, the PARC system 300 executes to identify correlatable factors and to use a smaller model when such correlations exist, especially if the variables that can be excluded in this way are expensive to measure accurately.

As disclosed herein, the PARC system 300 executes to determine that, given a forecasted runway configuration, visibility, traffic conditions, and other variable factors, the number of scheduled departures (and/or arrivals) will exceed capacity on a runway. For example, using the PARC system 300 runway capacity estimate, traffic planners may implement a departure metering program. Because the PARC system's estimated runway capacity is accurate, such departure metering neither starves the runways of flights nor creates excessive runway departure queues. For ease of description, the disclosure will, hereafter, refer to runway capacity as C, and runway demand as D. If D≤C, runway (departure) metering should not be necessary, but if D>C, traffic planners may want to implement runway departure metering. The PARC system 300 provides a runway capacity estimate than may allow traffic planners to see or determine when D>C; that is, the probability that demand D is greater than capacity C. Of course, runway demand D can vary; however, variance of D may be driven by aircraft and airline schedules. Runway capacity C varies based on a complex interaction of variable factors as described herein, including those factors shown in, and described with respect, to FIGS. 2A-2F and 3A. In an aspect, rather than predicting runway capacity C, the PARC system may develop a probability distribution for a single measure, or surrogate, of runway capacity C; such a single measure may be inter-aircraft spacing, as disclosed herein. That is, aircraft using a runway maintain a statutory minimum inter-aircraft spacing that may depend on several factors. However, the inter-aircraft spacing may have a larger minimal value based on safety considerations (see, e.g., wake vortexes illustrated in FIG. 2A) and the limitations of airport operations, and the inter-aircraft spacing may vary (e.g., increase beyond the statutory minimal value) with variation of many other factors. One aspect of a minimal value spacing is that its imposition leads to a maximum possible throughput for a runway. When all departing aircraft are classified as Heavy, there may be no wake vortex concern, yet at least some minimum spacing should and does exist. A typical minimal value is on the order of 35 seconds, meaning the maximum possible capacity of a single runway with all departing aircraft are in the Heavy weight class is approximately 100 aircraft per hour. A more limiting situation might be each Heavy aircraft followed by a Light or Medium aircraft. In this situation, a spacing of between 2 to 3 minutes may exist between one half the departing aircraft, which imposes an overall delay of about 15 minutes and a throughput of about 40 aircraft per hour, or two aircraft every three minutes. Thus, the PARC system 300 may use as an input, a maximum theoretical throughput ranging from 40 to 100 aircraft per hour, or a corresponding average minimal inter-aircraft spacing of 1.5 minutes to 0.5 minutes. As disclosed herein, other factors may lead to an increase the minimal inter-aircraft spacing. The PARC system 300 may operate to provide an estimate of inter-arrival spacing, or a corresponding estimate of runway capacity by considering the additional features that affect inter-aircraft spacing.

In an embodiment, the PARC system 300 creates Bayesian Network (BN) models of inter-aircraft spacing at a runway (runway takeoff initiation point for departures, runway threshold for arrivals) (and between arrivals and departures), and uses, in an aspect, Monte-Carlo simulation of airport traffic to estimate in real-time the arrival and departure rates that individual airport runways can sustain under specified operating conditions. The PARC system 300 creates BN models of inter-aircraft spacing at the runway from historical data of operating conditions and traffic movements. In this embodiment and aspect, the PARC system 300 uses the BN model results of inter-aircraft spacing at the runway in fast-time Monte-Carlo simulations of scheduled airport runway traffic under specified operating conditions to determine a distribution of possible throughputs for each runway. The PARC system 300 executes to estimate each airport runway's capacity value from the distribution of possible throughputs. The capacity estimate balances maximizing throughput while ensuring aircraft safety. The capacity estimates enable traffic managers to predict periods of aircraft demand-runway capacity imbalance and implement aircraft metering programs to maximize airport throughput and flight efficiency.

The PARC system's inter-aircraft runway spacing models include (1) minimal spacing models, (2) excess spacing models, and (3) spacing variability models. The minimal spacing models represent the required minimum spacing between aircraft. The minimal spacing models may represent or include current spacing minima for Small, Medium, Heavy, and Super (A380) aircraft weight classes to avoid wake-vortex effects; or spacing minima for special types of dependent runway configurations of the airport, such as closely-spaced parallel, crossing (actual or virtual), converging or other (see FIGS. 2A-2F and accompanying description). Excess spacing models represent additional spacing beyond wake-vortex spacing and any other mandated minimal spacing, and the spacing variability models represent the variability of both the minimal and excess spacing models. Sources of excess spacing may include: (1) spacing buffers that may be used by controllers and pilots as safeguards against imprecision in spacing control; (2) time required to conduct landings or takeoffs in instrument; marginal, or visual visibility conditions; (3) standard operating procedures of aircraft operators; (4) different traffic management operations and associated aircraft navigation capabilities and traffic management tools, such as Flightdeck Interval Management (FIM), Ground-based Interval Management (GIM) and Required Time of Arrival (RTA); and (5) other factors. The variability spacing models may account for variability in the inter-aircraft spacing due to the variability of the above factors and other factors. The PARC system 300 executes to create and use statistical models of excess spacing and variability spacing from historical runway operations data during saturated traffic demand conditions. BN modeling accounts for the multitude of variables that influence the characteristic mean and standard deviation of the excess spacing.

The PARC system 300 uses airport models that account for independent, or inter-dependent, operations among the airport runways as dictated by the runway configurations, flight procedures serving the runways, and standard procedures governing runway operations. In addition, the airport models account for taxiway crossings that may affect runway throughput. All runways and taxiways at an airport may be simulated simultaneously to account for throughput interrelations between runways and the effect of the interrelations on runway capacity.

The PARC system 300 executes to conduct Monte-Carlo simulations of airport runway traffic over the breadth of possible aircraft sequences and inter-aircraft spacing values to determine a distribution of possible capacities for each runway. The simulations account for the possible sequence permutations, within reasonable limits, of runway takeoffs and landings at each runway. The simulations use the BN models of the inter-aircraft spacing excesses and variabilities created from historical data to infer probability models of inter-aircraft spacing under specified prediction conditions. The resulting probability models are sampled to space aircraft in the simulation. The resulting sequence of landings and takeoffs simulated for each runway captures the inter-aircraft spacing values sampled from the probability models. For each sequence permutation, the PARC system 300 executes to conduct enough simulations to capture the extent of the inter-aircraft spacing models. The simulations produce a distribution of possible capacities, $C_i$, implied by the takeoff and landing schedules of each simulation. This process is repeated for all possible sequence permutations. The simulations produce a distribution of possible capacities $C_i$ for each runway under the specified operating conditions and scheduled traffic, from which a conservative capacity value may be selected. As noted herein, Time Based Flow Management (TBFM) is being implemented in the NAS; TBFM may include sequencing programs to achieve a specified interval between aircraft. Different sequencing programs to accommodate different phases of flight. A Departure Sequence Program (DSP) assigns a departure time to achieve a constant flow of traffic over a common point. This may involve departures from multiple airports. An En Route Sequencing Program (ESP) assigns a departure time that facilitates integration into the overhead stream. An Arrival Sequencing Program (ASP) assigns fix-crossing times to aircraft destined for the same airport. Inter-aircraft spacing estimates, as a measure of runway, capacity generated by the PARC system 300 may provide an input into the TBFM system when implemented. The runway capacity values may be used to predict, plan and control airport traffic, and for departure metering programs, such as Departure Metering Procedure (DMP), and TBFM metering of departures and arrivals.

In an embodiment, the PARC system 300 may use a single measure for runway capacity C. In this embodiment, the PARC system 300 provides a capacity estimation that yields a single capacity value (referred to hereafter as $\bar{T}$—i.e., inter-aircraft spacing) for each airport runway from a distribution of throughputs generated for each airport runway by the Monte-Carlo simulations. The capacity value $\bar{T}$ that the PARC system 300 selects from the distribution depends on the selection criteria, operating conditions and selection method. In a first example, a conservative percentile, such as 5 percent, could be selected to ensure 95 percent of the simulated runway capacities $C_i$ are greater than the selected capacity value $\bar{T}$; while this first example avoids overloading the runway with traffic, such a selection may result in underutilization of the runways. In a second example, an aggressive percentile, such as 30 percent, could be selected, such that only 70 percent of the simulated runway capacities $C_i$ are greater than the selected capacity value $\bar{T}$. This second example could result in a higher likelihood of efficient utilization of the airport's runways; however, this second example also may result in excessive controller workload to manage and separate aircraft.

Figure 2A:
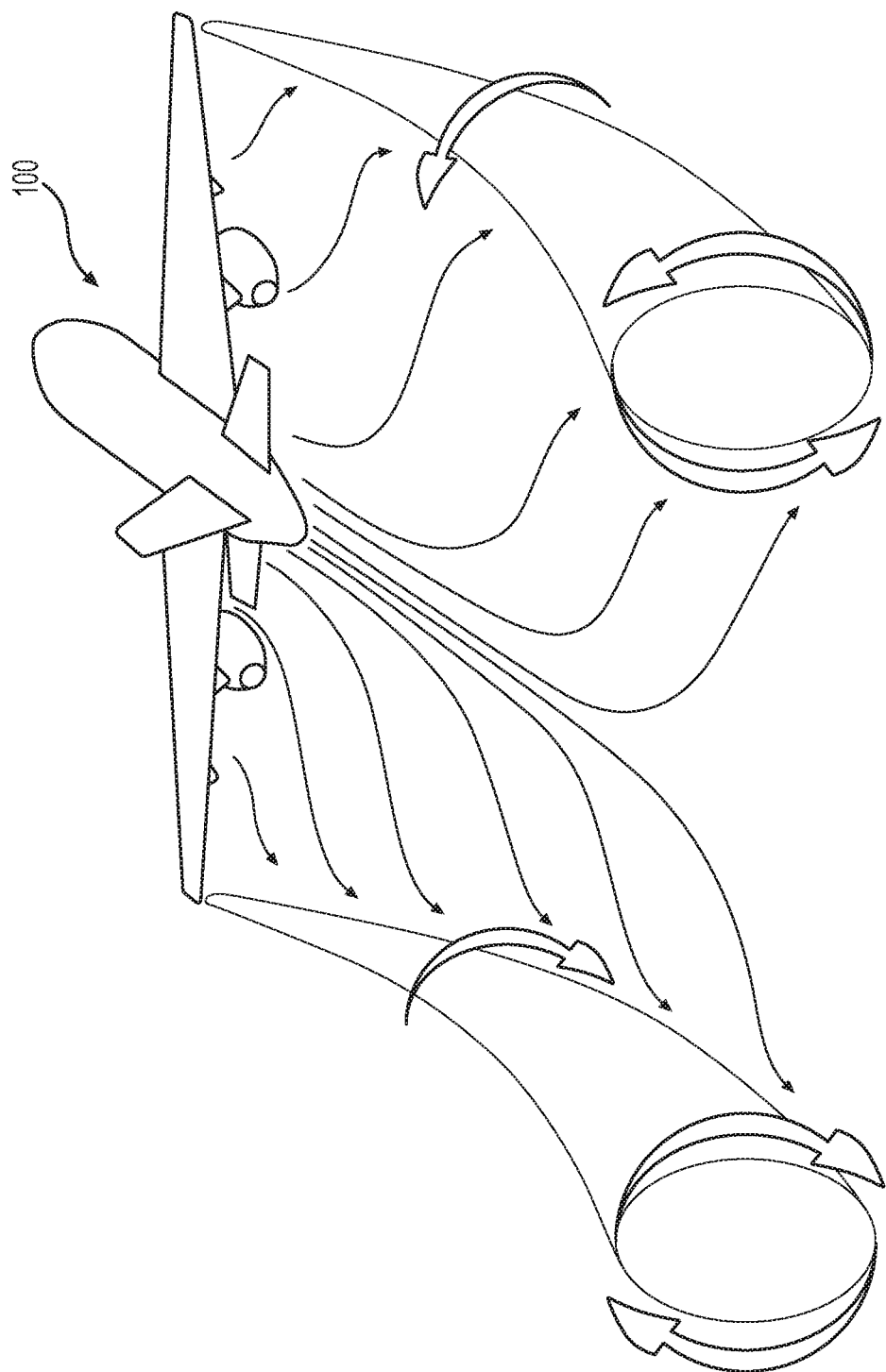
FIG. 2A illustrates a factor that may affect aircraft movement control.

FIG. 2A illustrates one factor that may affect inter-aircraft spacing. In FIG. 2A, a departing aircraft 100 produces trailing vortices and wake turbulence that could pose a threat to following aircraft. The magnitude of the vortices varies by aircraft weight, altitude, and wing construction. Using ICAO values, aircraft weight classes include Light, Medium, Heavy, and Super (the Airbus 380).

In general, aircraft positioning is controlled for all phases of flight operations, from takeoff though en-route, to landing, and standard separation requirements exist, expressed in nautical miles for en-route aircraft, and minutes for departing and arriving aircraft. The following table (Table 1) presents en-route separation minima, in nautical miles (NM) for classes of aircraft by weight using ICAO weight classes. (The Boeing 757, which is considered a Medium weight class aircraft, is treated as a Heavy weight class aircraft when leading because of many turbulence-induced incidents involving trailing aircraft.) The en-route separation minima are applicable when aircraft are provided with an ATS surveillance system. In general, the separation minima apply when the aircraft operate at the same altitude or at any altitude less than 1000 feet, the aircraft use the same runway or parallel runways separated by less than 760 meters, or crossing aircraft at the same altitude or less than 1000 feet. During approach, the separation minimum typically is applied by ATC Tower 46 (see FIG. 1C) using radar surveillance and radio communication with the aircraft.

TABLE 1

En-Route Aircraft Spacing

| Leading Aircraft | Following Aircraft | Separation Minima (NM) |
|---|---|---|
| Heavy | Heavy | 4 |
| Heavy | Medium | 5 |
| Heavy | Light | 6 |
| Medium | Light | 5 |
| Super (A380) | Heavy | 6 |
| Super (A380) | Medium | 7 |
| Super (A380) | Light | 8 |

Figure 2B:
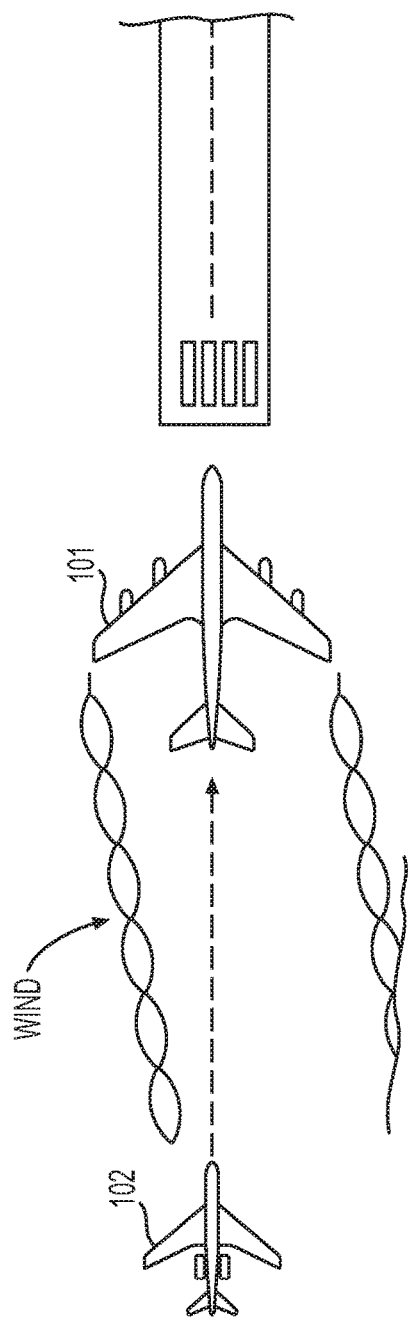

FIGS. 2B-2F illustrate example additional runway environments in which aircraft motion (or positioning) must be controlled to ensure safety (primarily for a trailing aircraft). FIG. 2B illustrates an arrival scenario where Heavy aircraft 101 leads Medium aircraft 102 in a landing approach. Table 2 presents separation minima (expressed in minutes) for this scenario. The separation minima are applicable when aircraft are provided with an ATS surveillance system. In general, the separation minima apply when the aircraft operate at the same altitude or at any altitude less than 1000 feet, the aircraft use the same runway or parallel runways separated by less than 760 meters, or crossing aircraft at the same altitude or less than 1000 feet. During approach, the separation minimum typically is applied by ATC Tower 46 (see FIG. 1C) in communication with the aircraft 102.

TABLE 2

Arrival Aircraft Spacing

| Leading Aircraft | Following Aircraft | Separation Minima (min) |
|---|---|---|
| Heavy | Medium | 2 |
| Heavy | Light | 3 |
| Medium | Light | 3 |
| Super (A380) | Medium | 3 |
| Super (A380) | Light | 4 |

Figure 2C:
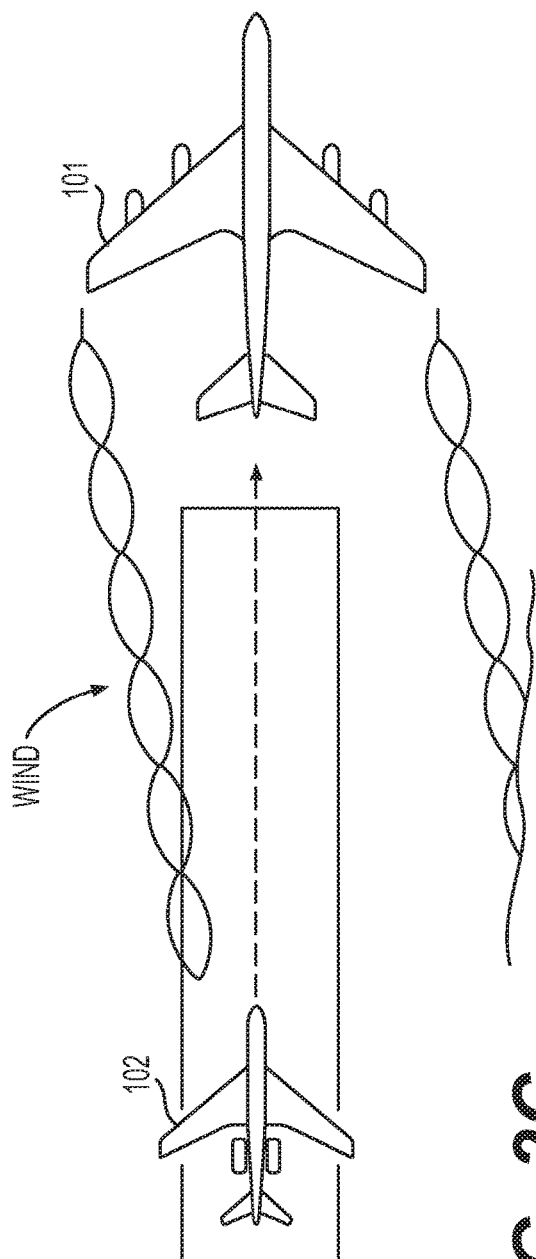

FIG. 2C illustrates a departure scenario, and Table 3 presents required separation minima. These separation minima apply when the aircraft are on the same runway, on parallel runways separated by less than 760 meters, and crossing runways if the projected flight path of the following aircraft may cross the projected flight path of the leading aircraft at the same altitude or less than 1000 feet below.

TABLE 3

Departure Aircraft Spacing

| Leading Aircraft | Following Aircraft | Separation Minima (min) |
|---|---|---|
| Heavy | Medium | 2 |
| Heavy | Light | 2 |
| Medium | Light | 2 |
| A380 | Medium | 3 |
| A380 | Light | 3 |

FIG. 2D illustrates a parallel runway scenario with a separation of less than 760 meters between runways.

Figure 2E:
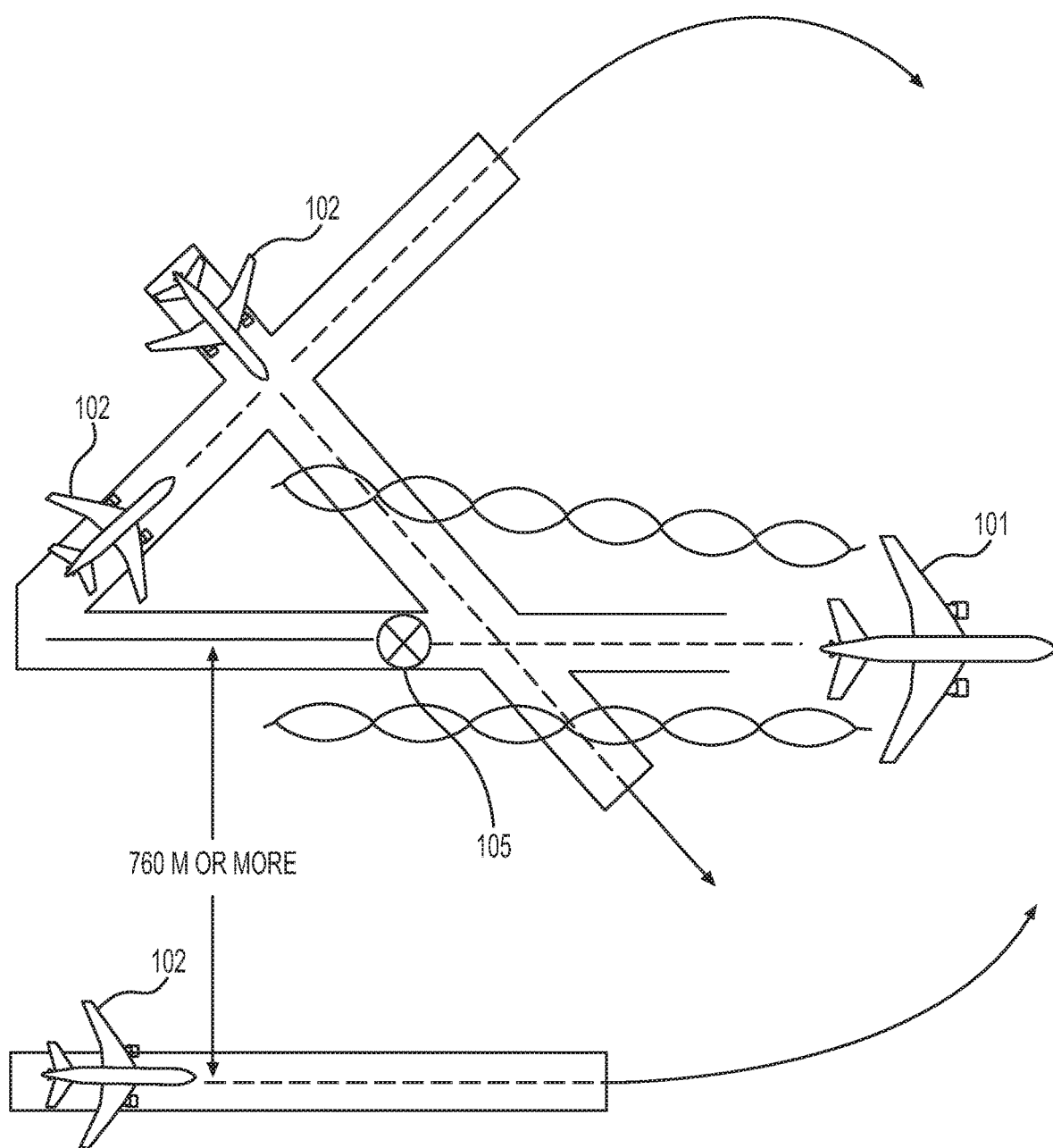

FIG. 2E illustrates a combination of parallel runways separated by more than 760 meters, and crossing runways with following aircraft having flight paths crossing the leading aircraft's flight path. In FIG. 2E, the point 105 represents the rotation point of the leading aircraft. FIG. 2E also illustrates the potential effect of changes in flight operation factors. For example, aircraft 101 is departing on a first runway. One aircraft 102 is departing on a second runway parallel to the first runway. Another aircraft 102 is departing on a third runway crossing the first runway. However, the flight paths of both aircraft 102 can be seen to cross the flight path of aircraft 102, which may impose a larger inter-aircraft spacing requirement than if the aircraft 102 were to turn away from the flight path of aircraft 101.

Figure 2F:
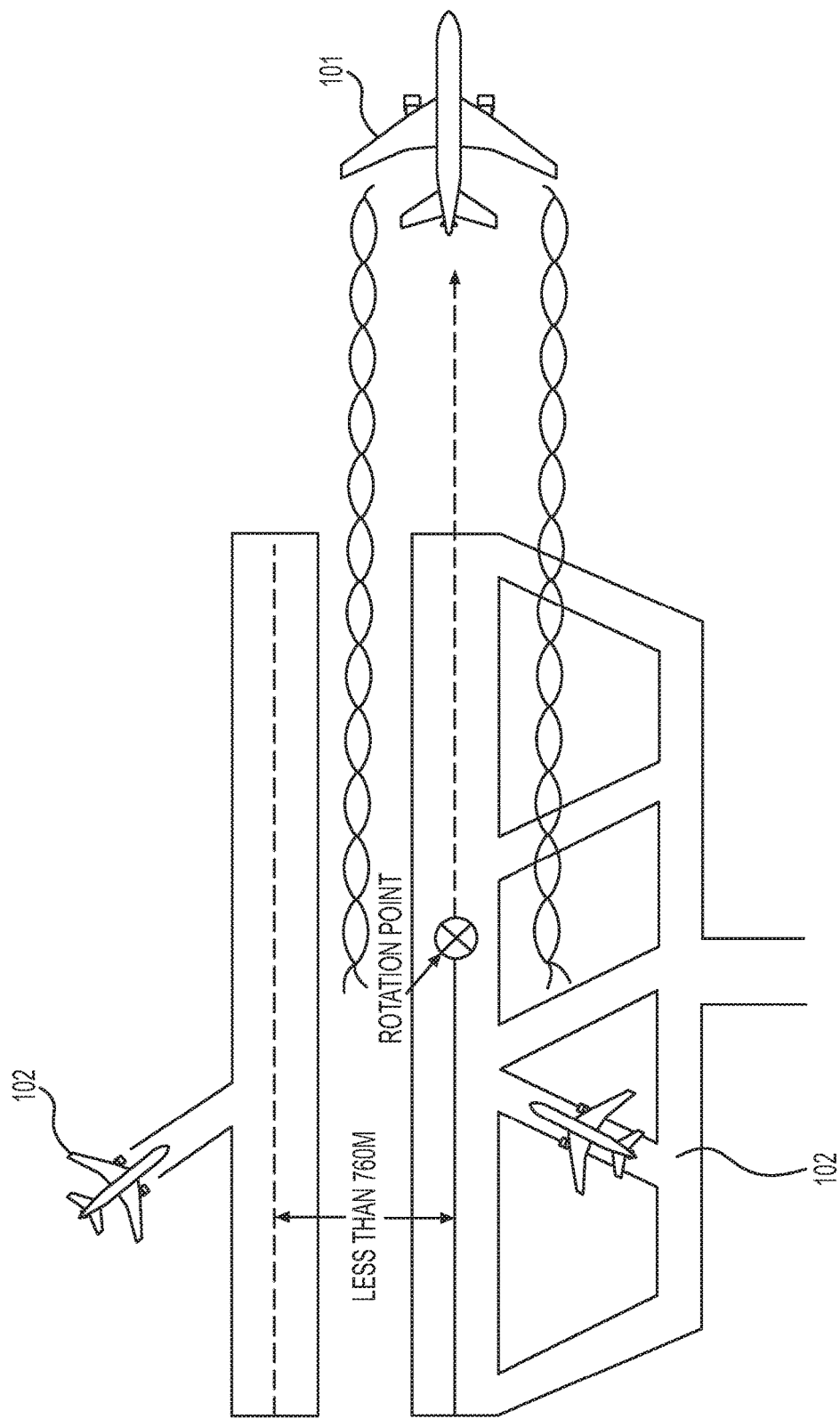

FIG. 2F illustrates a scenario in which the separation minima are three minutes for leading aircraft up to Heavy and four minutes for A380 leading aircraft. Other scenarios for which separation minima are specified include using a runway for takeoff in one direction and another runway for landing in an opposite direction, or using the same runway for takeoff and landing.

As can be appreciated from FIGS. 2A-2F, just accounting for separation minima to avoid wake turbulence can be a challenge. All participants in flight operations (e.g., the entities of FIG. 1C) bear some responsibility for maintaining the minimum separations. The same or other entities may have the additional concern of maximizing throughput (e.g., runway utilization) consistent with meeting the separation minima. When aircraft in a departure queue change (e.g., a Heavy aircraft is replaced by a Light aircraft), the separation minima may change, and such a change can affect runway utilization. However, many other factors may affect runway utilization. For example, any aircraft may experience a longer takeoff roll on a very hot day as opposed to a very cold day (less lift but also less resistance from tires). Similarly, wind conditions may affect takeoff roll. Other factors that may affect take off characteristics include individual pilot, and air traffic controller experience, and individual airline and airport procedures and communications protocols. Still other factors include individual airport runway configurations for runways in use at a particular time, departure path after wheels off, and visibility conditions (VFR or IFR). Finally, actual aircraft weight will affect aircraft roll. For example, a Heavy weight class aircraft may weigh less than its actual class value. All these factors are variables that may be considered when attempting to maximize runway utilization consistent with aircraft safety. Because these factors are variables, a probability distribution may be determined for each factor. In an aspect, the herein disclosed PARC system 300 and corresponding methods may use these probability distributions to predict airport runway capacity, and may provide the resulting prediction to various entities, including the entities shown in FIG. 1C, for controlling aircraft operations in an airport's movement areas. The runway capacity may be reflected in and expressed as a distribution of inter-aircraft spacing, with a minimum inter-aircraft spacing based on FAA and ICAO wake vortex requirements. Furthermore, rather than with current systems that simply attempt to meter aircraft by imposing, say, a limit on the number of aircraft in a departure queue defined as the time from pushback to Target Movement Area entry Time (TMAT), the herein disclosed PARC system 300 and methods may use predictions that are unique to individual airports, and within an airport, individual runways, taking into consideration individual aircraft characteristics, other system characteristics, environmental conditions, flight operation factors, and human factors. Still further, the PARC system 300 and methods may account for the effects of real-time changes (variability) of the factors noted above. Finally, the PARC system 300 and methods may provide predictions of aircraft runway capacity C to account for any combination of the factors and their values. In an aspect, the PARC system 300 will predict the capacities C of airport runways under specified operating conditions by obtaining data of planned and forecast operating conditions from the System Wide Information Management (SWIM) 50—see FIG. 1C. Supporting automation may compare the PARC system 300 capacity predictions to scheduled airport traffic to automatically detect periods of demand-capacity imbalance, which then may be applied to trigger TBFM and DMP metering automation to schedule airport arrivals and departures during the period covered by the PARC system airport runway capacity prediction, and to alert traffic management personnel to the identified traffic overage and metering process.

One example component of the PARC system 300 uses a Bayesian Network (BN), to model inter-aircraft spacing probability and the factors that affect that spacing probability. A second example component uses Monte-Carlo simulations of airport traffic under uncertainty conditions to estimate aircraft runway capacity C from a distribution of throughputs. Creating and sampling statistical Bayesian Network (BN) models of inter-aircraft spacing ensures the BN models can be used in the Monte-Carlo simulation to predict runway capacity C for departing aircraft. The BN modeling of the PARC system 300 may be based on and developed by: (1) processing and preparing real-world data to create BN models of inter-aircraft spacing—the data including inter-aircraft spacing values under saturated demand conditions and data corresponding to those spacing values that describe a candidate airport, weather and traffic factors, and other data that may affect the inter-aircraft spacing values; (2) creating BN models of inter-aircraft spacing that account for primary factors that appear to most strongly influence, or contribute to, excess inter-aircraft spacing using established methods to address the issue of sparse data—where the factors may be categorical (e.g., visual or instrument meteorological condition), or continuous (e.g., ceiling and visibility); and (3) assessing the validity of the thus-created BN models in predicting excess inter-aircraft spacing under various conditions. This last process may involve applying the BN models to different airport, weather, and traffic factors to obtain inter-aircraft spacing values, and comparing the values sampled from the BN models to actual inter-aircraft spacing data obtained from runway movements under those conditions to assess the reasonableness of the prediction results. The inter-aircraft spacing data for assessment and model verification are different from the data used for model-building. Thus, the PARC system 300 includes a training data set to create and update the BN models and a verification data set to assess the correctness of the BN models.

Figure 3A:
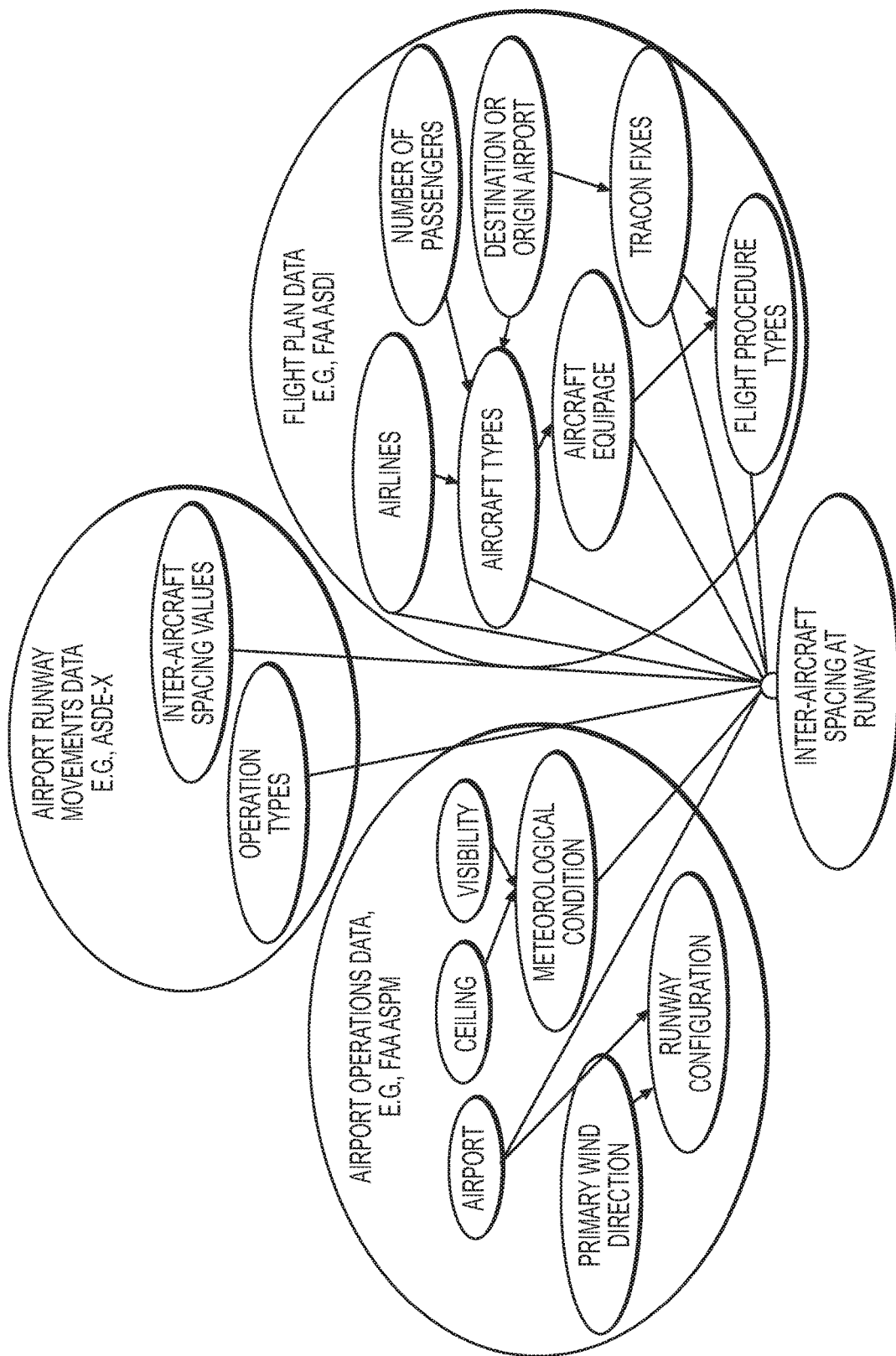
FIG. 3A illustrates factors that may influence inter-aircraft spacing on a runway.

In an embodiment, the example BN component first generates a BN model of inter-aircraft spacing for one or more of the key factors that could affect inter-aircraft spacing. The BN models of inter-aircraft spacing may be generated from processed historical operations and traffic data that capture the key factors affecting inter-aircraft spacing at a runway. FIG. 3A shows factors that may affect inter-aircraft spacing at a runway, and data sources where these factors may be obtained, for times or conditions of interest. The data sources provide the airport operations, movements and infrastructure data sources necessary to analyze and model inter-aircraft spacing and influencing factors for the airport. Data sources include FAA Aviation System Performance Metrics (ASPM) data for airport meteorological condition, ceiling and visibility data, as well as airport capacity data. Data sources also include FAA System Wide Information Management (SWIM) data for aircraft movements on the airport surface, and airport layout data fused with the aircraft movement data to determine time periods of runway queues and runway takeoff or landing times of aircraft to or from the airport of interest. The BN component associates aircraft movements and airport operating conditions and captures key factors that may affect inter-aircraft spacing at departure and arrival runways. The BN component processes the data to generate a data set used for creating the BN models.

Figure 3B:
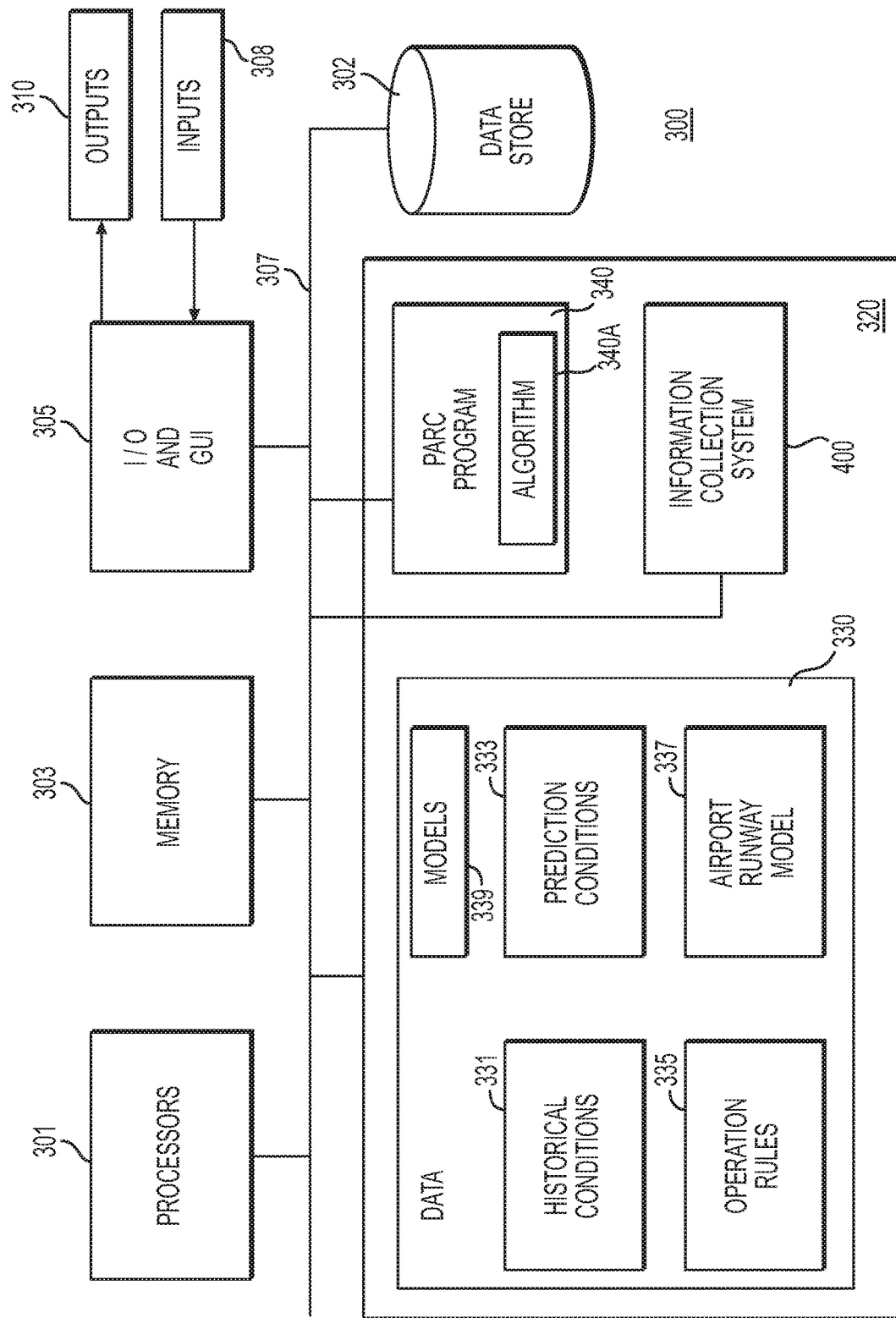
FIG. 3B illustrates an example aircraft runway capacity prediction system.

FIG. 3B illustrates an example PARC system 300 that uses probability and simulation processes to estimate a measure of runway capacity. In an aspect of this embodiment, the PARC system 300 uses Bayesian Network (BN) modeling of inter-aircraft spacing at a runway and Monte-Carlo simulation of airport traffic to estimate the arrival and departure rates that individual airport runways can sustain under specified operating conditions to enable the prediction of time periods of traffic demand/runway capacity imbalance and the implementation of traffic metering programs to maximize airport throughput and flight efficiency. In FIG. 3B, PARC system 300 includes hardware components, such as processors 301, memory 303, input/output (I/O) and user interface (U/I) 305, and data store 302, all of which are connected through communications and data bus 307. The data store 302 may be, or may include non-transitory, computer-readable storage media. The I/O and U/I 305 receives inputs 308 and provides outputs 310. The inputs 308 may include instructions from other computer systems and from human users, and data, such as the data from the sources shown in FIG. 3A. The outputs 310 may be provided to other computer systems and to various visual and audible displays. The outputs 310 may be provided as data. One such output is data provided to the entities shown in FIG. 1C, and may include information that may be used by those entities to impose, say, aircraft departure or arrival metering. In an aspect, the output data may be supplied to the TBFM program.

The PARC system 300 also includes PARC processing system 320, which in turn includes data system 330, PARC program 340, and information collection system 400. The data system 330 may be stored in the data store 302 or may be separately stored data. The program 340 also may be stored in the data store 302, and may be loaded into memory 303 and executed by the processors 301. The data in the data system 330 may include historical condition data 331, prediction condition data 333, operational rules 335, and airport runway models 337. The data system 330 also may store models 339 used by and/or created by and maintained by execution of components of the PARC program 340 (see FIGS. 3C-3F). The information collection system 400 is described, inter alia, with reference to FIGS. 4A-4D.

Conditions at an airport, and on a runway, may change over time. The change can occur rapidly and with little notice, or the change may occur gradually. Either way, the changing conditions may lead to an imbalance situation such that the number of aircraft scheduled to depart the runway (i.e., demand D) exceeds the capacity C of the runway. Stated another way, the actual capacity C of the runway may change with changing conditions. The PARC program 340 may include PARC algorithm 340A that, when executed, provides a parameter $\vec{T}$, where $\vec{T}$ denotes a measure of the inter-aircraft spacing between successive aircraft on the runway. In an embodiment, the measure $\vec{T}$ may be expressed as a distribution of values. In another embodiment, the runway capacity may be expressed as an expected value. In this later embodiment, a measure of runway capacity may be expressed as $E[g(\vec{T})]$, where $\vec{T} = (\vec{T}_1, \ldots, \vec{T}_n)$ denotes a random vector ($\vec{T}_i$ represents inter-aircraft spacing between the i'th and the (i+1)'st aircraft in a sequence of flights that has saturated the runway having a given density function $f(t_1, \ldots, t_n)$. The expected value, $E[g(\vec{T})]$, may be the solution to:

$$E[g(\vec{T})] = \int\!\int \ldots \int g(t_1, \ldots, t_n) f(t_1, \ldots, t_n) dt_1 dt_2 \ldots dt_n \quad \text{EQN 1}$$

for some n-dimensional function g, where g represents the exhibited capacity of the runway when a sequence of n aircraft, using that runway, have the given spacings. For example, $g(t_1, \ldots, t_n)$ may be equal to (n+1) divided by the sum of $t_1$ through $t_n$, i.e., the total number of aircraft divided by the total time. Should $E[g(\vec{T})]$ fall short of the actual or expected demand D for the runway, traffic control personnel may determine that departure metering is desirable. $E[g(\vec{T})]$ cannot be computed exactly or even approximated using numerical methods. However, $E[g(\vec{T})]$ may be approximated using simulation processes. The former embodiment of the measure of runway capacity, namely a distribution of $\vec{T}$ values may allow traffic control personnel to use a value within a desired confidence level.

Figure 3C:
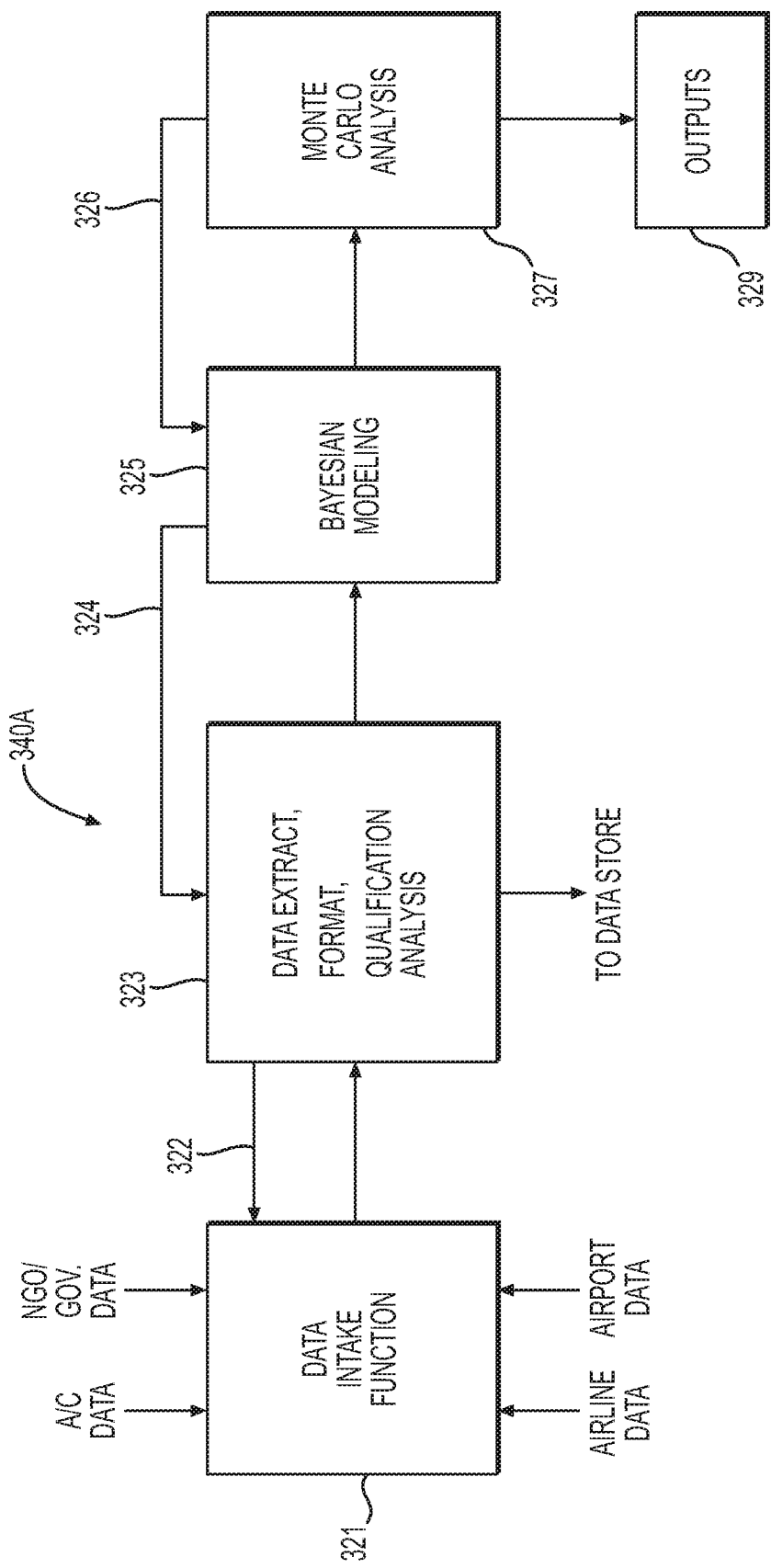
FIG. 3C illustrates an example algorithm executed by the system of FIG. 3B.

FIG. 3C illustrates an example overall PARC algorithm 340A showing functions that may be performed by the PARC system 300. In FIG. 3C, the functions include data intake function 321, data extraction, formatting, and qualification function 323, probability (e.g., Bayesian modeling) function 325, simulation (e.g., Monte Carlo) function 327, and data output function 329. All or some components of the PARC system 300 may operate or execute to support these functions. The data intake function 321 may involve intake of data in different formats including structured, semi-structured, and unstructured data from aircraft manufacturers, airlines, individual airports, government and non-government agencies and organizations, and other sources including network-based sources such as the Internet. Internet data sources may be mined to extract data from blogs, emails, traffic alerts posted on aviation-related Web sites, and other structured and unstructured Internet data sources. The data intake function 321 may involve "push" data and "pull" data. The data intake function 321 may involve accessing a data subscription service (e.g., a weather forecast subscription service). Some data and information may be directly monitored using monitoring devices connected to or associated with systems installed onboard aircraft, at Towers, or at Centers. The data intake function 321 provides input data to the data extraction, formatting, and qualification function 323, and may receive feedback, through data path 322. The data extraction, formatting, and qualification function 323 may include formatting data collected through the data intake function 321; such data and information may be in or of a raw, unprocessed and unfiltered form. The function 323 may involve use of devices to extract and distill relevant information from the data intake function 321. What information to extract and distill may be determined by an iterative process that may begin using information relative to a specific airport. This "seed" information may be scanned from information provided from the airport, in either electronic or hard-copy format. The seed information also may be entered manually by a human operator. The function 323 also may involve deriving additional "insight" as to what information should be collected through feedback process with the data intake function 321. The function 323 also may format the extracted data by, for example, correcting spelling errors or other errors in the data, expanding abbreviations, converting slang or manufacturer-specific names to a consistent taxonomy for products of the class of the product of interest, converting units of measure to a consistent format (e.g., meters to feet). The function 323 also may set a flag and/or provide an alert when specific data items are not available from the intake data intake function 321, or are insufficient to satisfy minimal data (sparse data or small sample size criteria).

The data intake function 321 and the data extraction, formatting, and qualification function 323 may be executed by a data intake module of the PARC system 300, or, alternately, by the information collection system 400, during defined collection periods and/or on an ad hoc basis. For example, aspects of the data intake function 321 and data extraction, formatting, and qualification function 323 may be performed (1) automatically and continually, (2) automatically and periodically (e.g., once per day), (3) periodically, on command (e.g., as commanded by ATC personnel), (4) episodically based on the occurrence of certain events (such as a change from visual to instrument conditions at the airport—the events may be defined by personnel at each airport, or may be defined in the PARC system 300), and on command, without any specific periodicity. In addition, not all data need be collected, extracted, formatted and qualified during each collection period. The data intake function 321, data extraction, formatting, and qualification function 323 may be executed independent of and without regard to execution of other functions of the PARC system 300. PARC system components that execute the function 323 are described in more detail, inter alia, with respect to FIGS. 4A-4D.

The probability analysis function 325 may involve creation and updating of a probability processes and models used to generate a distribution of $\vec{T}$ values. The function 325 also may involve verification of the models. In an aspect, the function 325 may involve using Bayesian processes to generate histograms of the variable features to determine if it is possible to predict $\vec{T}$, and if so, to make such a prediction with a statement of confidence. If it is not possible to make such a prediction using the information provided through the function 323, the function 325 may involve providing feedback 324 to the function 323. If a $\vec{T}$ prediction is possible, the function 325 includes providing the prediction for use in simulation function 327. In an aspect, the function 325 involves evaluation data processed through functions 321 and 323 to: (1) identify the variables that influence inter-aircraft spacing for the particular airport under the different operating conditions, and (2) compute the statistical model of inter-aircraft spacing that captures those variables. In an embodiment, the processed data are first divided into separate data sets, one for parameterizing the model, the other for verifying the model. Bayesian Network (BN) modeling then is used to represent the joint probability distribution of inter-aircraft spacing and the other variables. The BN model captures inter-aircraft spacing, the variables that influence inter-aircraft spacing, and the relationships among the variables, in a Probabilistic Graphical Model (PGM). The PGM is a Directed Acyclic Graph (DAG) comprising "parent" and "child" nodes which capture dependencies among the variables. FIG. 3F presents an example DAG. The parent and child nodes represent Conditional Probability Distributions (CPDs), where the probability of the child node depends on the conditions/values of the parent node(s). The CPDs are estimated from data. The Bayesian Network DAG implements a generalized BN model for inter-aircraft spacing that captures the breadth of variables that could influence the spacing at an airport runway. Variables include airport operating conditions, such as meteorological conditions such as ceiling, visibility, and runway crosswind speed; flight variables such as weight class, aircraft type, airline, airport runway, arrival or departure route or fix, navigation capability; facility variables such as the identities of the airport, TRACON and ARTCC controllers; whether SUA was active; etc. In another aspect of function 325, the processed data are analyzed and partitioned for model parameterization to tailor the DAG to the characteristics and historical operations of the particular airport, by determining which variables in the generalized DAG influence the inter-aircraft spacing and one another, and which do not. As a result of this analysis, the generalized DAG is "pruned" of nodes or their interconnections, thereby tailoring the generalized DAG to the specific airport and conditions. The variables or interconnections removed, and information related to their removal, may be stored for future reference. Next, the processed data are partitioned for model parameterization are analyzed to estimate Conditional Probability Distributions (CPDs) for the parent and child nodes in the tailored DAG to produce the BN model of inter-aircraft spacing and its influencing variables for the particular airport and conditions. Finally, the significant correlations between or among the variables, if any, may be captured within the BN model as a side-effect of determining CPDs for each node.

In an aspect, the BN model may be based on a single key factor affecting inter-aircraft spacing such as, for example, a Visual or Instrument Meteorological Condition (VMC or IMC) of an airport; that is, the BN model is a function of single factor (or variable) (e.g., $p(t|x_1)$), where t is a value to be tested (that is, for example, inter-aircraft spacing) and $x_1$ is the "single key factor"—the meteorological condition of the airport. In a specific example, A may be the event, inter-aircraft spacing $\bar{t}$ is greater than or equal to a given time t; and B is the event, airport visibility conditions require IFR. The BN model then may compute a probability distribution of $\bar{t}$ when the single factor of airport visibility requiring that instrument flight rules are in effect. In other aspects, the BN model may be a function of multiple variables, $x_i$, and the BN model may expand incrementally to include additional variables $x_i$ such as, for example, aircraft type ($x_2$), aircraft operator ($x_3$), traffic density ($x_3$) . . . and ($x_n$) to include the inter-aircraft spacing (e.g., $p(t|x_1, x_2, \ldots, x_n)$). That is, the hypothesis to be tested is the probability of an inter-aircraft spacing t given probabilities of IFR, aircraft weight W (e.g., Heavy), and Airline R. Probabilistic inference then executes to apply the BN model(s) of inter-aircraft spacing over the extent of the identified factors, thereby producing a joint probability mass function of inter-aircraft spacing and the identified factors.

An example CPD estimation follows. In an embodiment, the inter-aircraft spacing values obtained from the historical data are sorted into discrete bins (corresponding to distinct conditions) according to the values of the variables associated with them (i.e., the specific conditions for that value). The probability distribution governing the inter-aircraft spacing values in each bin is assumed to be Gaussian, i.e., $$P(x) = \frac{1}{\sigma\sqrt{2\pi}} e^{-(x-\mu)^2/2\sigma^2},$$

and the mean and standard deviation ($\mu$, $\sigma$) of the distribution are estimated from the spacing values in the bin. Each inter-aircraft spacing value obtained from the historical data is categorized based on the particular values of the variables associated with that value. In an aspect, each inter-aircraft spacing value $T_k$ may be "binned" according to the airport meteorological condition it occurs under. The airport meteorological condition variable $X_1$ is categorical in assuming one of three states, Visual, Marginal or Instrument, $X_1^V$, $X_1^M$, $X_1^I$. Each inter-aircraft spacing value is naturally categorized as occurring under Visual, Marginal or Instrument airport meteorological conditions, that is, $T_k(X_1)$. For instance, each inter-aircraft spacing value $T_k$ may be "binned" according to the local airport time of day during which they occur. This variable $X_2$ is continuous between 12:00 AM and 11:59 PM, so this variable is discretized into distinct bins corresponding to distinct time periods, such as 1-hour periods, throughout the 24-hour day, $X_2^1, X_2^2, \ldots, X_2^{24}$. Each inter-aircraft spacing value is categorized by the particular 1-hour time period during the day when it occurs, $T_k(X_2)$. In this manner, each inter-aircraft spacing value $T_k$ may be categorized by the values of the variables associated with it—the particular bin of each variable, for instance $T_k(X_1, X_2)$. Thus, each distinct combination of bins $(X_1^i, X_2^j)$ among the variables has a distinct set of inter-aircraft spacing values, $T_1, \ldots, T_N$. The mean and standard deviation of the Gaussian distribution governing each bin (condition), i.e., $(\mu, \sigma)_{(x_1^i, x_2^j)}$ are estimated from the sample mean and standard deviation of the time spacing values obtained for that condition.

The function 325 also may involve assessing the correctness of BN models used in the estimation of runway capacity by comparing the estimated values to inter-aircraft spacing values obtained from actual movements obtained under the same or similar conditions as those used with the BN models. In an aspect, the PARC system 300 may use the Root Mean Square Error (RMSE) and/or Mean Absolute Error (MAE) between the estimated and actual values to assess the correctness of the BN models. This process may involve sampling of statistical inter-aircraft spacing distributions and verifying representation of original spacing data distributions from sampling the BN model. The BN component executes to compare the modeled probability distributions of inter-aircraft spacing to those obtained from a test data set to verify the correctness of the BN model. In another aspect, the PARC system 300 may use the log likelihood of a test data set as a means of determining the accuracy of the BN model. A larger log likelihood (i.e., more positive) for the same data set indicates a better representation of the data.

The simulation function 327 involves execution of a simulation routine, such as a Monte Carlo simulation, using the input from the probability function 325. The simulation function 327 also may involve providing feedback 326 to the probability function 325, which may use the feedback 326 to refine the probabilities. The simulation function 327 involves performing statistical analysis of the data to specify airport runway capacity as a probabilistic quantity, where the probability represents the confidence of the estimated capacity, or the likelihood of deviating from that capacity. The function 327 uses the predicted operating conditions data as evidence for the BN model to predict the probability distributions of inter-aircraft spacing perturbations from the standard spacing, for the specified sequence of flights to each airport runway. Next, the function applies the probability distributions in a Monte-Carlo simulation of airport runway traffic. The function 327 then repeats the cycle of predicting spacing distributions and simulating runway traffic until the inter-aircraft spacing probability distributions have been sufficiently well sampled to accurately represent those distributions in the runway operations results. The function 327 may involve perturbing the sequence of flights and other operating conditions as per user specifications, and performs additional Monte Carlo simulations, to evaluate their alternative capacity values. A high probability capacity value has a high likelihood of being achieved. A low probability capacity value has a lower certainty of being achieved.

The output function 329 provides electronic, visual, and audio signals, data and reports to connected computer systems for use therein and for displaying to ATC personnel and traffic managers, and for input into traffic control systems for actually metering traffic.

Figure 3D:
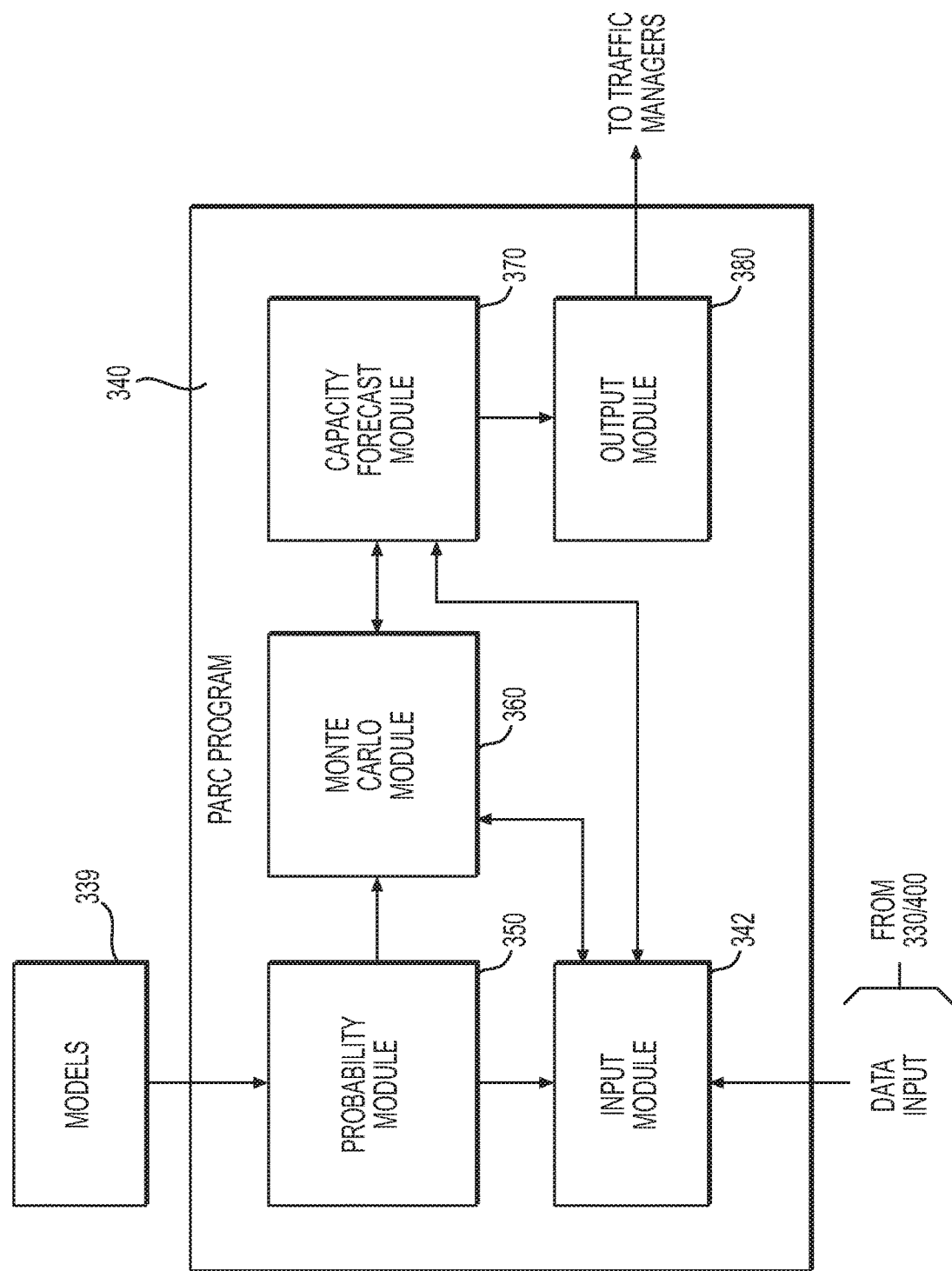
FIGS. 3D-3G illustrate components of the system of FIG. 3B.

FIG. 3D shows example components and data structures of and embodiment of the PARC program 340, including input module 342, probability module 350, Monte Carlo module 360, capacity forecast module 370, and output module 380. Input module 342 receives data from the data store 302 (see FIG. 3B). The input module 342 performs the functions 321 and 323 shown in FIG. 3C, which include extracting, formatting, qualifying, and analyzing data, storing the thus-processed data, including the probability model 350, which is constructed and parameterized from the input data, and providing the thus-processed data to other modules of the PARC program 340, as shown by the connecting arrows among the modules. Optionally and in addition, the information collection system 400 may execute to perform some aspects of the functions 321 and 323, and the system 400 and the input module 342 may cooperate in executing the functions 321 and 323. The probability module 350 retrieves and stores probability models 339 of data system 330 (see FIG. 3B); executes probability processes, and creates and updates probability models as described with respect to function 325 of FIG. 3C. Embodiments of the probability module 350 are described further with respect to FIGS. 3E-3F. The Monte Carlo module 360 executes various simulations to provide an estimate of runway capacity C as disclosed, inter alia, with respect to function 327 of FIG. 3C. The capacity forecast module 370 provides runway capacity C forecasts based on existing operational conditions at a specific airport and further at a specific runway of the airport using as an input the appropriate Monte Carlo simulation results from module 360. Finally, the output module 380 provides various outputs as disclosed herein with respect to function 329 of FIG. 3C.

The input module 342 uses data from the information collection system 400, as well as other data and information inputs, and performs data processing functions in cooperation with the probability module 350 to allow the module 350 to create probabilistic models of inter-aircraft spacing and to estimate airport runway capacities that are tailored to the particular airport and given set of specified operating conditions. Operating conditions may be predicted or planned. The module 342 may analyze and combine inter-aircraft spacing aircraft movement, and flight plan data; and airport operating procedures and airport infrastructure information to determine inter-aircraft spacing, actual or virtual runway queue lengths, and other quantities. The module 342 may analyze and combine data from Federal operating rules, local operating procedures, and local and national traffic flow operations to assess inter-aircraft spacing relative to appropriate minima and may derive data capturing inter-aircraft spacing variability as per those variables. The module 342 may analyze and combine data such as runway landing or takeoff times of airport arrivals and departures. Runway time may be obtained from the landing/takeoff times of aircraft landing to or taking off from the airport from FAA SWIM Surface Movement Events messages data. If actual runway time is not available, the input module 342 may obtain a runway time estimation using the latitude/longitude/altitude time history of each airport flight for the particular time period under consideration from the FAA SWIM Surface Movement Events (SME) data. Further, the input module 342 may obtain geospatial data describing the boundaries of the airport's air-side infrastructure, including runways, taxiways, ramp areas, terminals and gates; and the airport's runway configuration time history from FAA ASPM data for FAA SWIM Airport Configuration data, and determine the time history of the airport's runways used for arrivals and departures. The input module 342 then may assess the position history of each airport flight to determine if it was within the boundaries of one of the active arrival or departure runways. Next, the input module 342 may assess the occupancy event to determine if it was a landing or takeoff event, estimated by various methods, including (1) runway occupancy time above threshold, (2) transit distance between runway entry/exit points above threshold, and (3) average transit speed during occupancy above threshold, where thresholds correspond to values reasonable for aircraft in landing or takeoff phases of flight. The input module 342 may assess landing or takeoff runway data for airport arrivals and departures by performing a runway threshold association. To do this, the input module 342 may obtain the landing/takeoff times and latitude/longitude positions of aircraft landing to or taking off from the airport from FAA SWIM Surface Movement Events messages, and the thresholds of the airport's runways are obtained from FAA National Flight Data Center (NFDC) data. The input module 342 then may compute the Great Circle distance of the flight's landing or takeoff point to the threshold of each of the airport's runways, assuming the runway threshold with the shortest distance to the flight's landing or takeoff point is its landing or takeoff runway.

Next, the input module 342 may perform a series of data correlations. For a flight plan correlation, the estimated runway for each flight is correlated with the runway recorded in its flight plan data available from the FAA SWIM Flight Plan Information message. The message is correlated with the flight as per the flight number, the arrival date, the origin and destination airport, and the scheduled arrival time. For an airport runway configuration correlation, the estimated runway is correlated with the airport runway configuration reported in the FAA SWIM Airport Configuration message which records changes to the airport's arrival and departure runways, or in the FAA Aviation System Performance Metrics (ASPM) data, which records the airport arrival and departure runways for each 15-minute time period of operations, to verify the estimated airport runway was operational at the time of the aircraft's landing or takeoff.

Next, the input module 342 may estimate runway crossing times of airport taxiing flights. The estimation begins by obtaining the latitude/longitude/altitude time history of each airport flight for the particular time period under consideration from the FAA SWIM Surface Movement Events (SME) data. Next, the input module 343 obtains geospatial data describing the boundaries of the airport's air-side infrastructure, including runways, taxiways, ramp areas, terminals and gates and the airport's runway configuration time history from FAA ASPM data for FAA SWIM Airport Configuration data. The input module 342 then determines the time history of the airport's runways used for arrivals and departures, and assess the position history of each airport flight to determine if it crossed one of the active arrival or departure runways. Crossing may be estimated by various methods, including (1) runway occupancy time below threshold, (2) transit distance between runway entry/exit points below threshold, and (3) average transit speed below threshold, where thresholds correspond to values reasonable for aircraft in taxi phase of flight.

The input module 342 computes inter-aircraft spacing minima by first obtaining the weight class, wing span or other current aircraft runway separation criterion of each aircraft from the FAA SWIM Flight Plan Information message for the flight, either by accessing weight class information extracted from the flight plan information, or by obtaining the aircraft type from the flight plan information and mapping this to the FAA minimum separation standards. Next, the input module 342 obtains the FAA's minimum separation standards for airport runway operations, based on aircraft weight class, aircraft wing span, or other factors as per current regulations and the FAA's minimum separation criteria governing particular runway interactions. Using these data, the input module 342 determines appropriate application as per the airport's runway configuration recorded in the FAA SWIM Airport Configuration messages or FAA ASPM data for the time period during which the runway operations occurred.

The input module 342 assesses Traffic Flow Management (TFM) restrictions by first obtaining FAA TFM data describing the time period of application and MIT distances or time-based metering rates of traffic flow restrictions applied to flights via particular fixes, routes, airspace regions or destination airports during the time period of operations being analyzed. The input module 342 synthesizes the standard operating procedures and letters of agreement of the airport, Terminal Radar Approach Control (TRACON), and Air Route Traffic Control Center (ARTCC) to determine the fixes, routes and airspace regions typically used for air traffic operations. Next, the input module 342 associates each applicable restriction with a particular fix, route, airspace region, or destination or origin airport that could have been used by a flight to/from the airport by the name string of the resource or geographic location of the resource to determine which resources were affected by the restriction. Finally, the input module 342 obtains FAA TFM data describing takeoff or landing times assigned to departures and arrivals from/to the subject airport during the time period of operations being analyzed.

The input module 342 derives inter-aircraft spacing deviations of airport runway operations considering runway operations sequences and aircraft pairs filtering. For runway operations sequences, given a set of arrival, departure and taxiing aircraft with associated runways, sort the operations by runway, for each runway, the input module 342 sorts the operations by increasing landing, takeoff or runway crossing time. The time spacing between the flights is computed as the time difference between their landing, takeoff or runway crossing times. For aircraft pairs filtering, the input module assesses each aircraft to determine if it may have been subject to FAA TFM restrictions. This includes determining if any of the flight numbers of the airport arrivals or departures, obtained from FAA SWIM Flight Plan Information data, match the flight numbers associated with scheduled departure or landing times specified in the FAA TFM restrictions data. This also includes determining if the flight plan for a flight, including its origin or destination airport and filed route of flight obtained from FAA SWIM Flight Plan Information data, match the fixes, waypoints, airspace regions or airports of the FAA TFM MIT or time-based metering restrictions that were applicable to the airport and active during the flight's operation. For those flights estimated to have been affected by FAA TFM actions, the input module 342 filters those flights from the set of aircraft for inter-aircraft spacing analysis. The input module 342 flags the remaining flight pairs which lack gaps in between them from the filtering, for inter-flight spacing analysis.

For each successive pair of remaining arrival, departure or crossing taxiing aircraft, the input module 342 determines the largest of the FAA's minimum separation criteria governing that flight pair. If applicable, the input module 342 converts distance separations into time separations by dividing by an assumed transit speed, subtracts the minimum separation time from the inter-aircraft time spacing to determine the inter-aircraft time spacing deviation—or, inter-aircraft time spacing in excess or less than the minimum—for the pair of aircraft, associate with that value the airport conditions, flight conditions, and others associated under which that value occurred, and stores the inter-aircraft time spacing value and its meta-data in data system 330.

The input module 342 accumulates and assesses airport conditions. In an aspect, the input module 342 accesses, combines, and analyzes weather data, federal operating rules, and local operating procedures to determine the local weather operating state such as instrument, marginal or visual conditions; Instrument Landing System (ILS) approach category as per visibility; light or heavy crosswinds; and open or closed arrival and departure routes.

The input module 342 also access, combines, and analyzes airport operating conditions, local operating procedures and weather data to determine aggregate operating modes of the airport and airspace, including airport runway configuration, airport and airspace flow direction, and airspace routing configuration.

For runway configuration, the input module 342 determines the active runways during the time period of operations analysis from FAA SWIM Airport Configuration message reported configuration changes or FAA ASPM data-recorded hourly configurations. The input module 342 also analyzes FAA TFM data during the time period of operations analysis to determine if Ground Stops were implemented for the airport or any of its runways. The input module 342 also compares the data to reported or estimated airport takeoff or landing operations, and their associated runways, to determine if all runways were used as reported.

For meteorological conditions, the input module 342 analyzes standard operating procedures for the airport and TRACON to determine their specified ceiling and visibility thresholds for instrument, marginal and visual meteorological conditions, and to determine the visibility level (Category I, II or III) under instrument conditions. The input module 342 further analyzes FAA SWIM Airport Configuration messages, or analyzes FAA ASPM data-recorded hourly ceiling and visibility measures in conjunction with the SOP-specified meteorological thresholds, to determine the meteorological condition of the airport during the time period of operations being analyzed and when changes in the meteorological condition of the airport occur. The input module 342 further analyzes the visibility measures against federal standards for Category I, II or III instrument approaches to determine the approach procedures.

For crosswind level effects, the input module 342 analyzes FAA ASPM data for FAA SWIM Airport Configuration data to determine the active arrival and departure runways of the airport during the time period of operations being analyzed and when changes in the runway configuration occur. The input module 342 also analyzes FAA ASPM data to determine the prevailing wind speed and direction, and when their changes occur, during the time period of operations being analyzed. For each time period when the wind direction and speed are constant, the input module 342 computes the crosswind at each runway as the vector component of wind perpendicular to the runway and compares the runway crosswind to thresholds specified in the airport and TRACON SOPs to determine if this is a low, medium or high crosswind.

Finally, the input module 342 assesses airspace configurations, which begins with synthesizing standard operating procedures for the airport, TRACON and ARTCC to obtain the arrival and departure fixes or routes used in particular airport runway and airspace configurations. The input module 342 then analyzes the FAA ASPM data or FAA SWIM Airport Configuration messages to determine which airport runways were being used, analyzes the FAA SWIM Flight Plan Information messages of the flights to estimate the arrival or departure procedures being flown by arrivals and departures, analyzes the FAA NFDC data to determine the arrival or departure fix along each identified flight procedure. Finally, the input module 342, matches the strings describing the active airport runways and arrival or departure routes or fixes to a standard airport and airspace configuration, or flag as a new configuration.

The input module 342 may store some or all the data, data analyses, and other information in the data system 330.

The probability module 350 may use a form of machine learning to develop, produce, and update the algorithm 340A to overcome problems with prior art methods that use explicit algorithms, including, for example, explicit algorithms that follow static program instructions, through building a model from sample inputs. The algorithm 340A allows the PARC system 300 to produce reliable, repeatable decisions and results, and to uncover hidden insights in data related to runway capacity through, for example, learning from historical relationships and trends in the data. The module 350 may, for example, employ an unsupervised approach to model development in which nodes are not defined initially, leaving the algorithm 340A "on its own" to find structure in its data inputs. This form of unsupervised, deep learning, which consists of multiple nodes and layers in the Bayesian Network, allows the algorithm 340A to discover hidden patterns in the data.

In various airport environments disclosed herein, many variables (see FIG. 3A) may be random and unknown (e.g., system noise, incomplete observations, dynamic changes in the environment). To account for these factors, the PARC system 300 may include mechanisms that forecast runway capacity in the presence of random and uncertain variables by representing conditional dependencies among the random and uncertain variables. The mechanisms may use as a data input statistical data sampled in the environments, such as the historical condition data 331 of FIG. 3B. Moreover, the mechanisms handle many kinds of variables present in the airport environments.

Figure 3E:
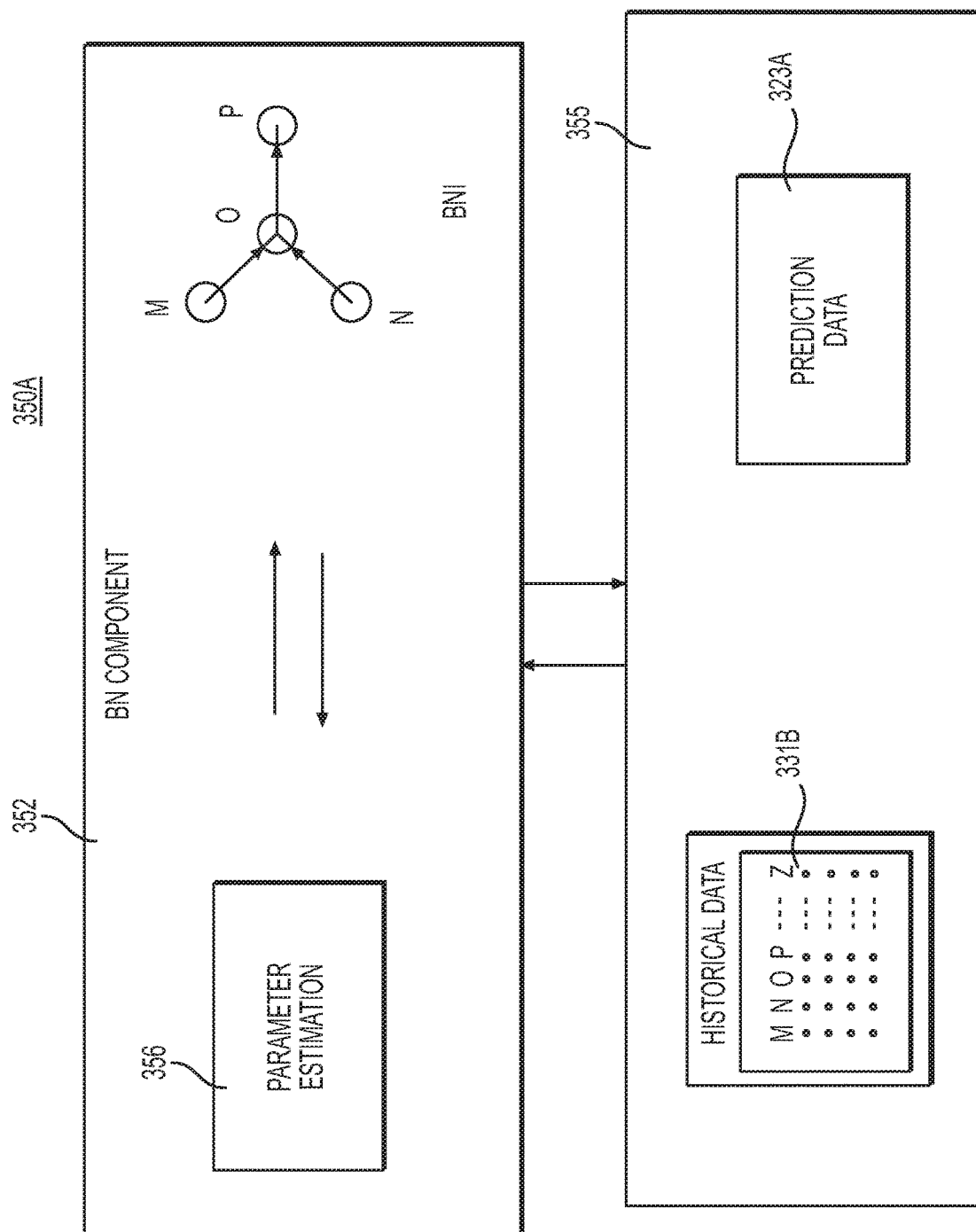
Figure 3F:
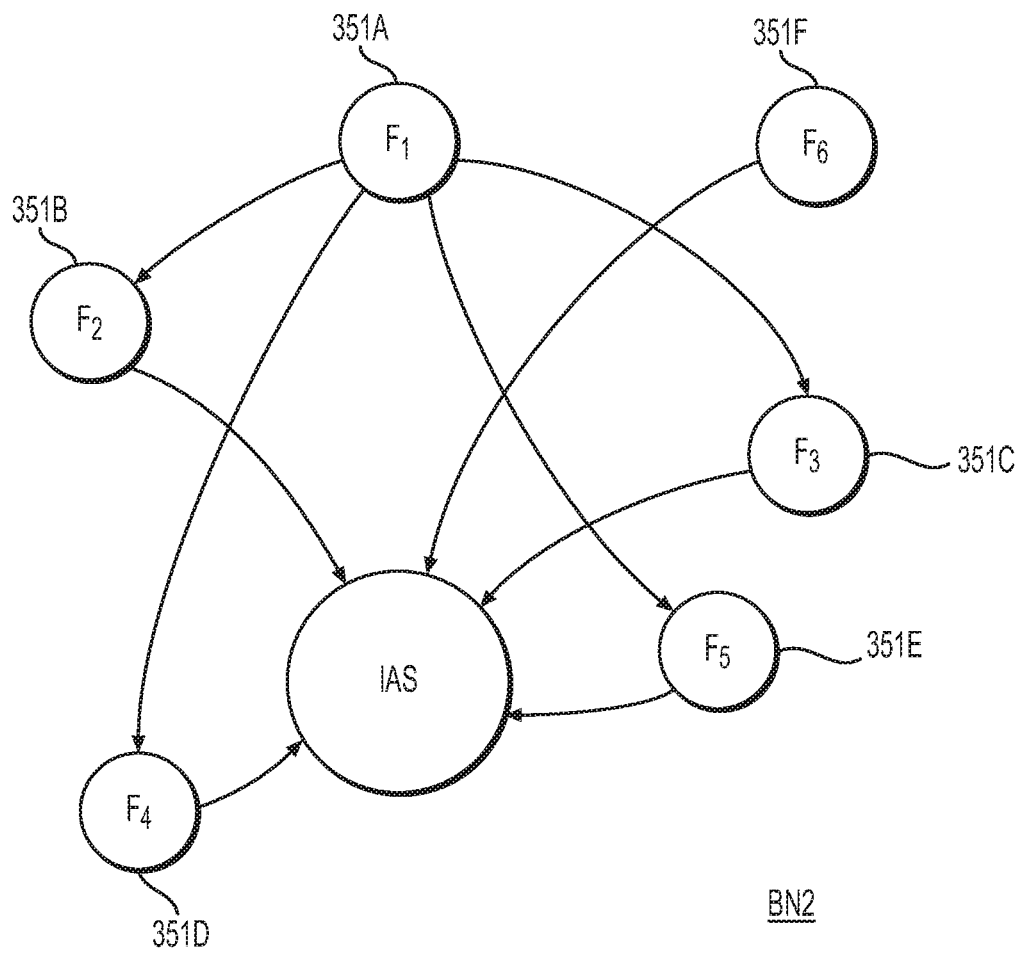

FIG. 3E illustrates an embodiment of the probability module 350. Specifically, FIG. 3E illustrates aspects of example Bayesian module 350A, which includes Bayesian Network (BN) component 352 and data component 355. The data component 355 includes historical data set 331B and prediction data set 323A. The historical data set 331B and prediction data set 323A may include measured values for variables, and information about the co-occurrence of these measured values. For example, the historical data set 331B may be represented in a table of measured values with one column for each variable and a row for each instance where all the variables are measured. The BN component 352 includes parameter estimation subcomponent 356, which is used to generate parameter values for each node of Bayesian Network BN1. The Bayesian Network BN1 may be generated by components of the PARC system 300.

The Bayesian network BN1 may be expressed visually as a Directed Acyclic Graph (DAG). A more detailed rendition of example Bayesian network BN1 is shown in FIG. 3F, and includes multiple nodes, each of which represents one or more random variables in the airport environments, and each of which has conditional probabilities. Directed links in the network represent dependencies between nodes. In FIG. 3F, example Bayesian network BN2 is intended to produce a probability distribution for inter-aircraft spacing (IAS) based on a number of factors $F_i$ related to weather. Node 351A represents the condition, ground temperature is below freezing. Such a weather condition may affect multiple factors that in turn affect the IAS distribution. Node 351B is the condition, visibility changes from visual to instrument; node 351C is the condition, aircraft have anti-icing equipment installed; node 351D is the condition airport 20 has deicing equipment; node 351E, aircraft roll is affected by temperature change (e.g., tires deflate); node 351F, aircraft type (e.g., wide body) is more affected by temperature.

Returning to FIG. 3E, the parameter estimation subcomponent 356 may execute a maximum a posteriori estimation process and/or a maximum likelihood parameter estimation process. The maximum likelihood parameter estimation process chooses conditional probability distributions (CPDs) from a parameterized set so that the CPDs maximize the probability of the observed data. That is, with $L(\theta:\mathcal{D})$ the likelihood function, $\mathcal{D}$ the data, $\theta$ the parameters, and with values ranging over $\Theta$, and $\hat{\theta}$ the selected parameter values:

$$L(\hat{\theta}:\mathcal{D}) = \max_{\theta \in \Theta} L(\theta:\mathcal{D}) \qquad \text{EQN 2}$$

For Bayesian estimation, the parameters (that select the CPDs) are treated as random variables, each with a prior distribution. The multiple sets of measured values are also treated as random variables in the same joint distribution as the parameters. Using Bayes Theorem, the posterior distribution of the parameter values can be estimated, given the measured values (the data). That is, with P(θ) the prior distribution over the parameters:

$$P(\theta \mid \mathcal{D}) = \frac{P(\mathcal{D} \mid \theta) P(\theta)}{P(\mathcal{D})} \quad \text{EQN 3}$$

In Equation 3, the numerator is the joint probability distribution P($\mathcal{D}$, θ) and the denominator is obtained by marginalizing this over θ.

The maximum a posteriori (MAP) estimation process selects those parameter values that maximize the posterior distribution from Bayesian estimation. This is often easier to compute than Bayesian estimation because the normalizing denominator in Bayesian estimation, which depends only on the data, is not needed to find the maximum with respect to CPD parameters.

FIGS. 3E-3F illustrate aspects of a Bayesian Network that may be used in a process to forecast runway capacity. Optionally, the PARC system 300 may include other probability-based and statistics-based components that may be used in the forecasting process. One such component is correlation module 390, shown in FIG. 3G. The correlation module 390 may be incorporated as a component of the PARC program 340 of FIG. 3D. Two or more random variables are correlated when they tend to fluctuate together. Various statistical metrics, such as Pearson's correlation coefficient, can be used to measure the degree of correlation between random variables in a data set. Measurement of correlation can be used to test the quality of the historical data about inter-flight separation that PARC uses to form its statistical model. In cases where random variables are understood to be causally connected, observing the expected correlation gives more confidence in the reliability of the data set. Unexpected correlation between random variables may signal a bias in the data set that can skew the statistical model. Correlation is also helpful in identifying outliers in the historical data set that should be removed before model generation. Such outliers can arise, for example, from faults in measuring devices or recording devices that have produced or recorded wrong data. When a statistical model includes, jointly, some variables that are highly correlated, it might be no more accurate, as a predictor of other variables, than a similar model that excludes some of the correlated variables. For reasons of parsimony, it may be beneficial for PARC to use a smaller model when such correlations exist, especially if the variables that can be excluded in this way are expensive to measure accurately. Regardless of whether correlated variables are excluded from the statistical model, known correlations still may be used to determine whether operating conditions, for which PARC is making a capacity prediction, are similar to the historical data on which the statistical model is based. When such operating conditions are not similar to the historical data, then capacity predictions from PARC may have greater uncertainty. If PARC program 340 includes correlation module 390, then module 390 will carry out one or more of the functions disclosed herein.

Figure 3G:
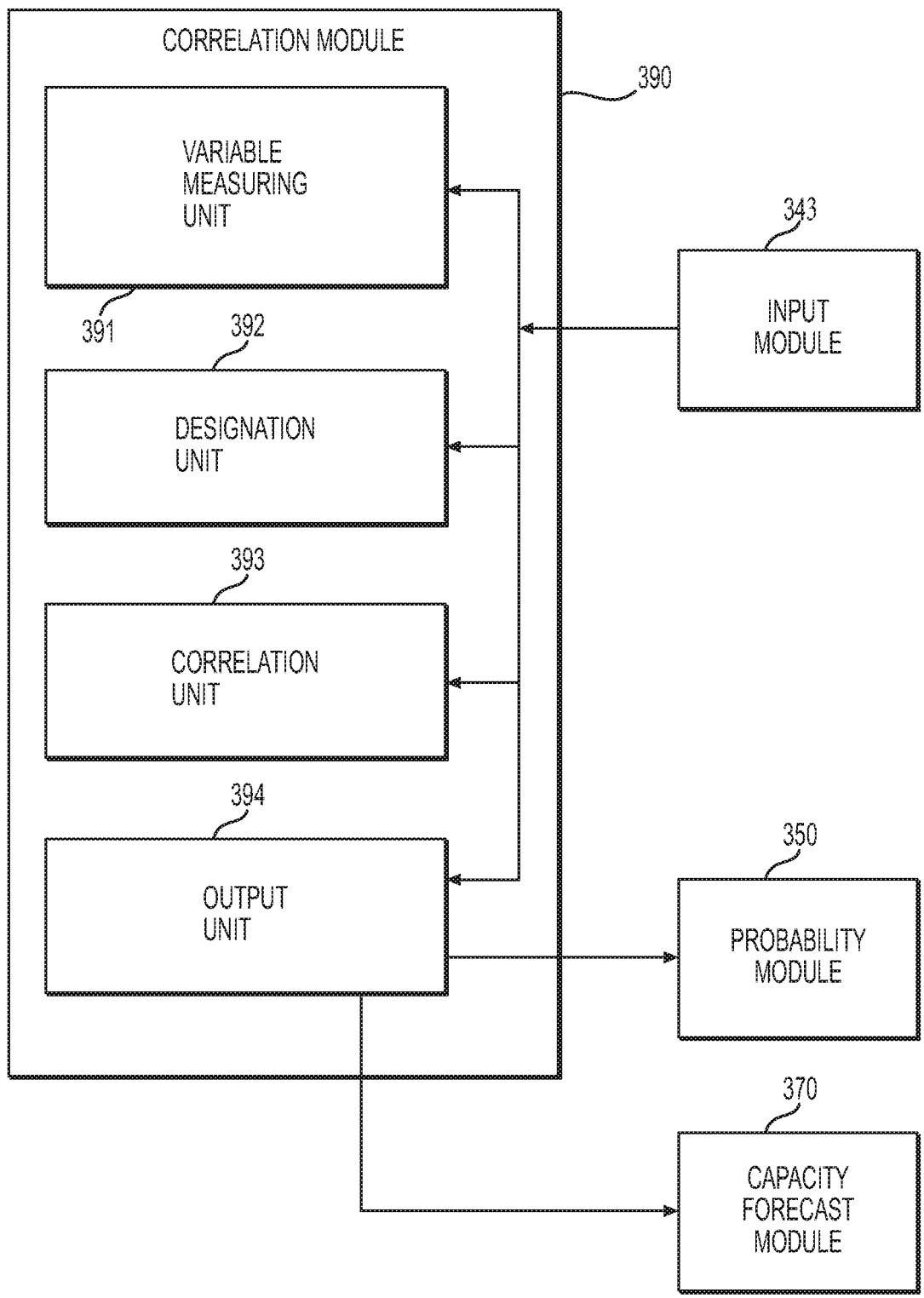

In FIG. 3G, correlation module 390 may be incorporated into the PARC system 300, and may use information such as that explicitly shown in FIG. 3A and information implicit in FIG. 3A. The module 390 may be used in addition to other modules of the PARC system 300, or, as described herein, to replace some functions of certain modules. In an embodiment, the module 390 operates in conjunction with input module 342 to find correlations in data obtained by information collection system 400 (see FIG. 4A). In an aspect, module 390 may include a variable measuring unit 391 that measures or collects (when necessary), processes, and analyzes information related to certain factors (i.e., a variables) that may be identified or defined for a runway of interest that may experience a demand-capacity imbalance. The unit 391 also may measure variables for runways of interest that may be designated as similar to an existing runway for which a demand-balance analysis has been completed. The data used by the module 390 also may be derived or extracted from data contained in the data system 330. A designation unit 392 may perform the designation between the runway of interest and other runways. To perform this designation, the unit 392 may execute a matching or similarity algorithm that compares factors that pertain to the runway of interest with factors for a number of other runways as stored in the data system 330. A correlation unit 393 may measure covariance between the variables defined for the runway of interest and similar runway. Output unit 394 provides information from the correlation unit 393 to other components and modules of the PARC system 300. For example, the output unit 394 may provide runway correlation information to the probability module 350 and the capacity forecast module 370 of FIG. 3D. In addition to runway correlation information, the module 390 may be used to predict or forecast capacity for the runway of interest for different scenarios.

Besides finding correlations between and among runways and runway factors, the runway capacity forecast, and secondary analyses, may be improved by finding correlations between and among factors and by using multiple, different types of factors. Still further, certain types of data factors may be analyzed to determine which is or are most important to an accurate runway capacity forecast. The runway capacity forecast then may execute using only the most important types of factors (or only a single, important factor). For example, referring to FIG. 3A, airport visibility may be determined to be most important (i.e., the most reliable variable) factor for forecasting runway capacity.

Figure 4A:
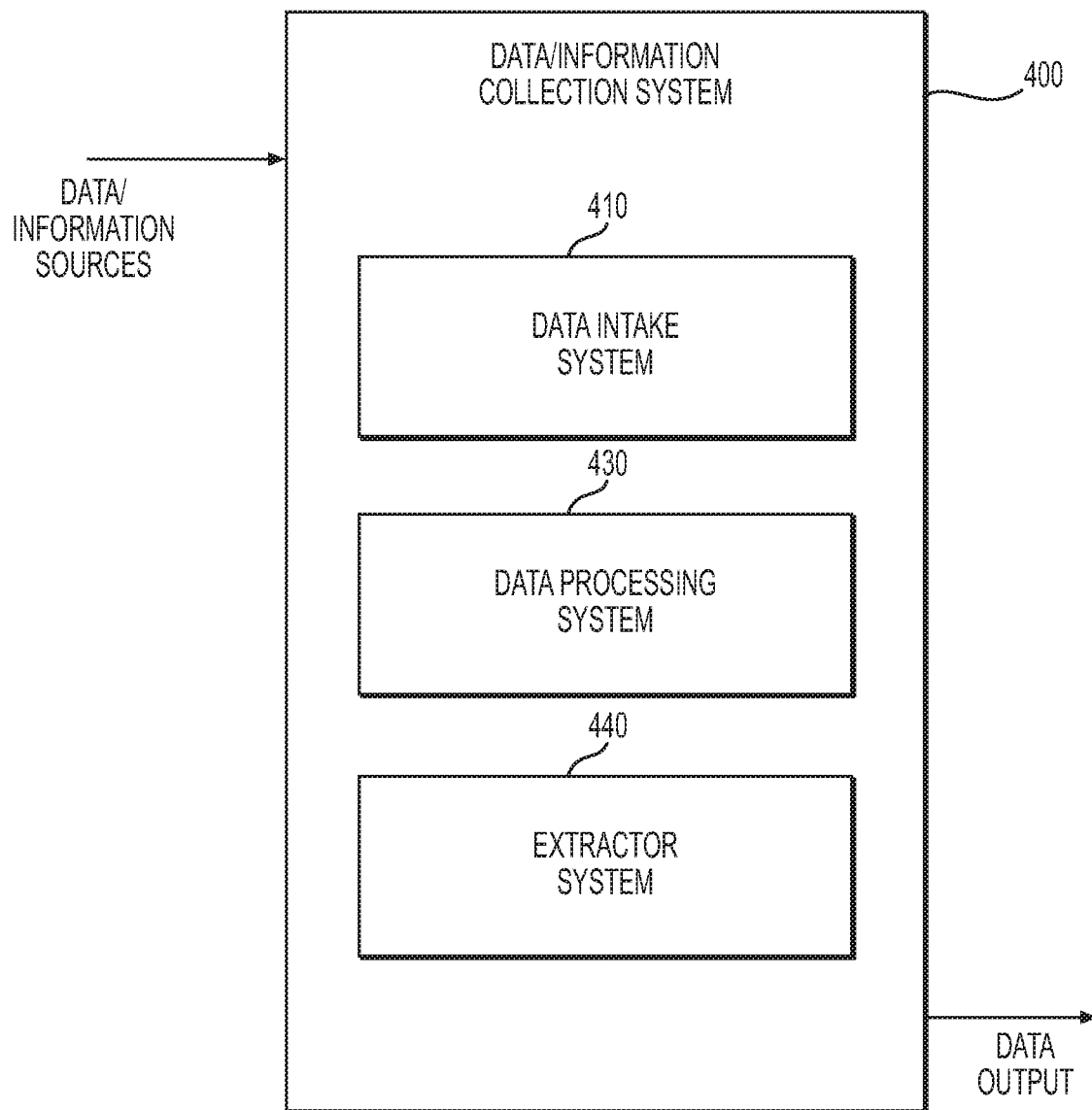
FIGS. 4A-4D illustrates additional components that may be incorporated into the system of FIG. 3B.

FIG. 4A illustrates information collection system 400. The system 400 includes data intake system 410, data processing system 430, and data extractor system 440.

Figure 4B:
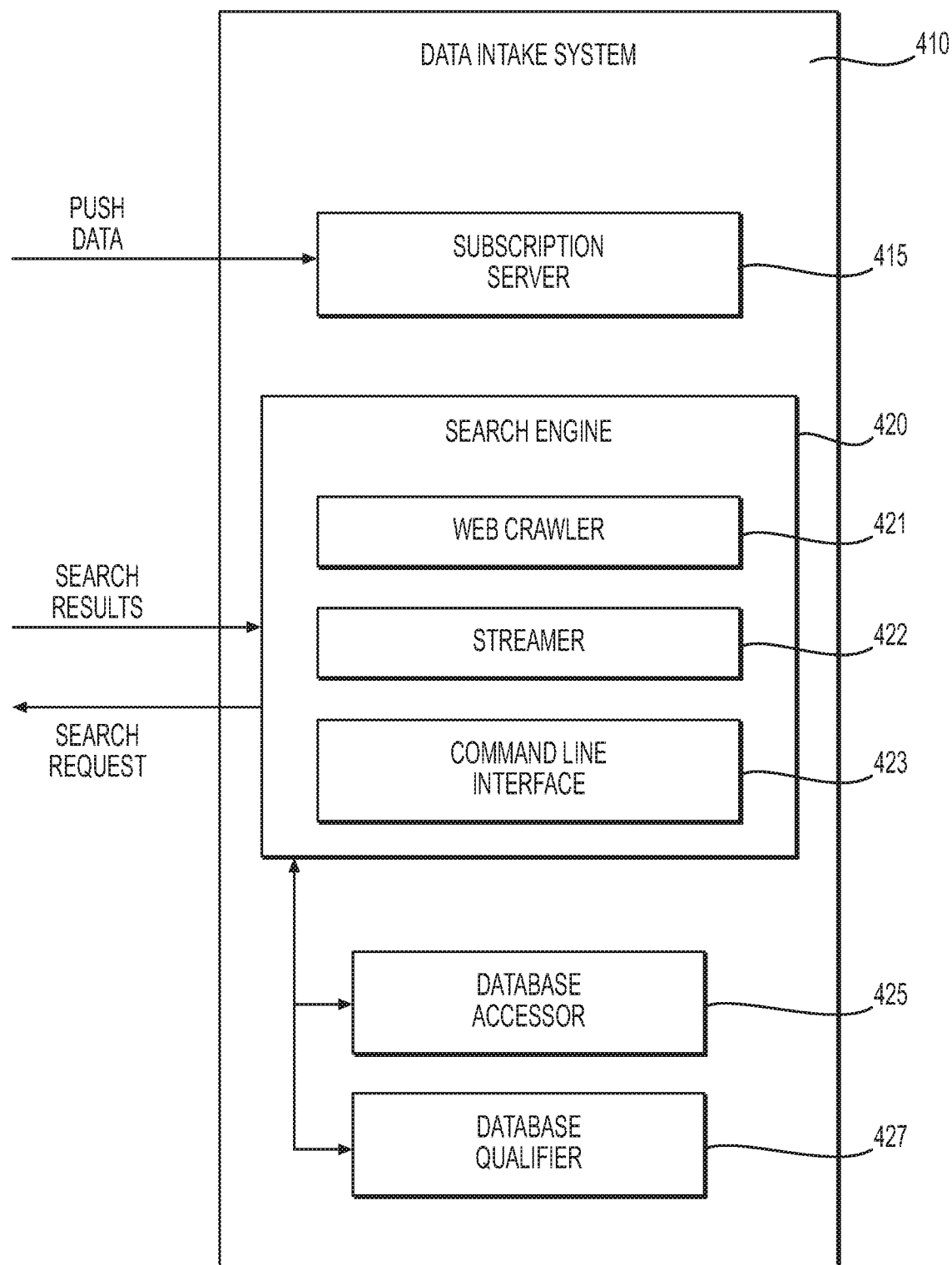

FIG. 4B illustrates data intake system 410. The data intake system 410 may receive data, information, programs and models from sources such as those shown in FIGS. 1C and 3A. The data intake system 410 includes subscription server 415, search engine 420, database accessor 425, and database qualifier 427. These components of the data intake system 410 may be used to receive push data and to extract pull data. For example, subscription server 415 may operate to receive various weather reports and information from notification services such as the FAA advisory circular service. The system 410 also may include a search engine 420 that includes associated Web crawler 421. The Web crawler 421 may be configured to search selected online content that is publicly available. The Web crawler 421 may index certain Web sites that provide streaming data sources. The system search engine 420 may include streamer 422 that consumes and processes streaming data. The search engine 420 also may include a command line interface device 423 that accesses data from structured data sources. The search engine 420 may include, or may cooperate with, a database accessor 425 that performs an initial database access operation and a database qualifier 427 that determines the schema for a searched or accessed database in order to efficiently and accurately access data in the database. One system and method for determining a database schema is disclosed in U.S. Pat. No. 5,522,066, "Interface for Accessing Multiple Records Stored in Different File System Formats," the contents of which are hereby incorporated by reference. Thus, the "big data" collected by the system 400 may be collected and stored using tools specific to characteristics of the big data. For example, institution big data is existing accumulated data, and existing database contents may be accessed and stored using the command line interface device 423. System big data is data collected in real time and that may be stored using the streamer 422. Social big data, including text information and images (static and moving (video)); social big data in any format, such as short sentences (tweets) or news, or a keyword or hashtag may be collected and stored using Web crawler 421.

As disclosed herein, the data intake system 410 receives and processes unique combination of airport, air traffic and weather data for estimating and specifying runway capacity. One category of the data is historical operations data. The historical operations data includes aircraft position-time data and/or quantities derived from it, including landing (ON) and takeoff (OFF) times, runway exit and entry times, gate-in (IN) and gate-out (OUT), arrival and departure fix crossing times, surface and terminal airspace transit times, actual and virtual queues of departures and arrivals. Flight information includes airline, aircraft type, weight class, navigation capabilities and equipment; and flight plan information including origin or destination airport, route of flight, scheduled arrival and departure time, flight crew capabilities. Airport traffic demand characteristics include levels, time-period profiles (e.g., banked or constant), and aggregate characteristics as per flight plans and movements. Airport operating conditions include runway configurations, wind direction and speed, visibility, ceiling, local weather characteristics, identities of airport traffic controllers and managers, noise abatement programs. Airspace operating conditions include arrival fixes and departure fixes or gates, available airspace and routes, airspace configuration data, and Special Use Airspace (SUA) activity.

Another category of data includes operations data. Local air traffic operations data include operations impacting airport arrivals and departures, such as Wake Turbulence Mitigation For Departures (WTMD), Departure Sequencing Program (DSP), Established on Required Navigation Performance (EoR), Equivalent Lateral Spacing Operations (ELSO). Local and national traffic flow control operations include operations impacting airport departures and arrivals, including Ground Delay Programs (GDPs), Airspace Flow Programs (AFPs), Severe Weather Avoidance Plans (SWAPs) and associated Miles In Trail (MIT) restrictions, Expected Departure Clearance Times (EDCTs) and reroutes; and Time-Based Flow Management (TBFM) operations.

Yet another data category includes airport-specific operating rules, procedures, and agreements. Federal operating rules include inter-aircraft separation minima as per aircraft characteristics, runway configuration, flight route and atmospheric conditions, and traffic management and control operations. Airport standard operating procedures including runway configurations for different wind conditions, configurations of other airports and airspace, noise abatement procedures, and other constraints; runway entry and exit points and their use, including Land And Hold Short Operations (LAHSO) and parallel taxiways; hardstands and other aircraft parking areas on the airport surface; arrival and departure flight procedure assignments and arrival fix and departure gate/fix assignments as per assigned runway, origin or destination, and other considerations; local air traffic management procedures such as Equivalent Lateral Spacing Operations (ELSO), Established on RNP (EoR) or others. Letters Of Agreement (LOA) include agreements with controlling Terminal Radar Approach Control (TRACON) and Air Route Traffic Control Center (ARTCC); and any neighboring airports, military and commercial facilities that impact operations. Information includes Miles-In-Trail restrictions, Ground Stops, route reassignments or other traffic control measures for particular categories of arrivals and departures; restricted runway uses, routes or airspaces and conditions.

Still another data category is infrastructure data, which include data describing airport runway threshold locations and layouts; locations of route navigation waypoints and arrival metering fixes and departure fixes/gates.

A further data category is specified/predicted operating conditions data. These data include airport and airspace weather conditions, including forecast ceiling, visibility, winds and weather patterns; airport and airspace operating conditions, including airport runway configuration and surface routes, arrival and departure routes; air traffic, including quantity, temporal distribution and flight plan and aircraft characteristics of airport traffic; and planned traffic; and traffic management measures, including MIT or GS implementations, time-based metering operations, or other traffic flow limits.

Figure 4C:
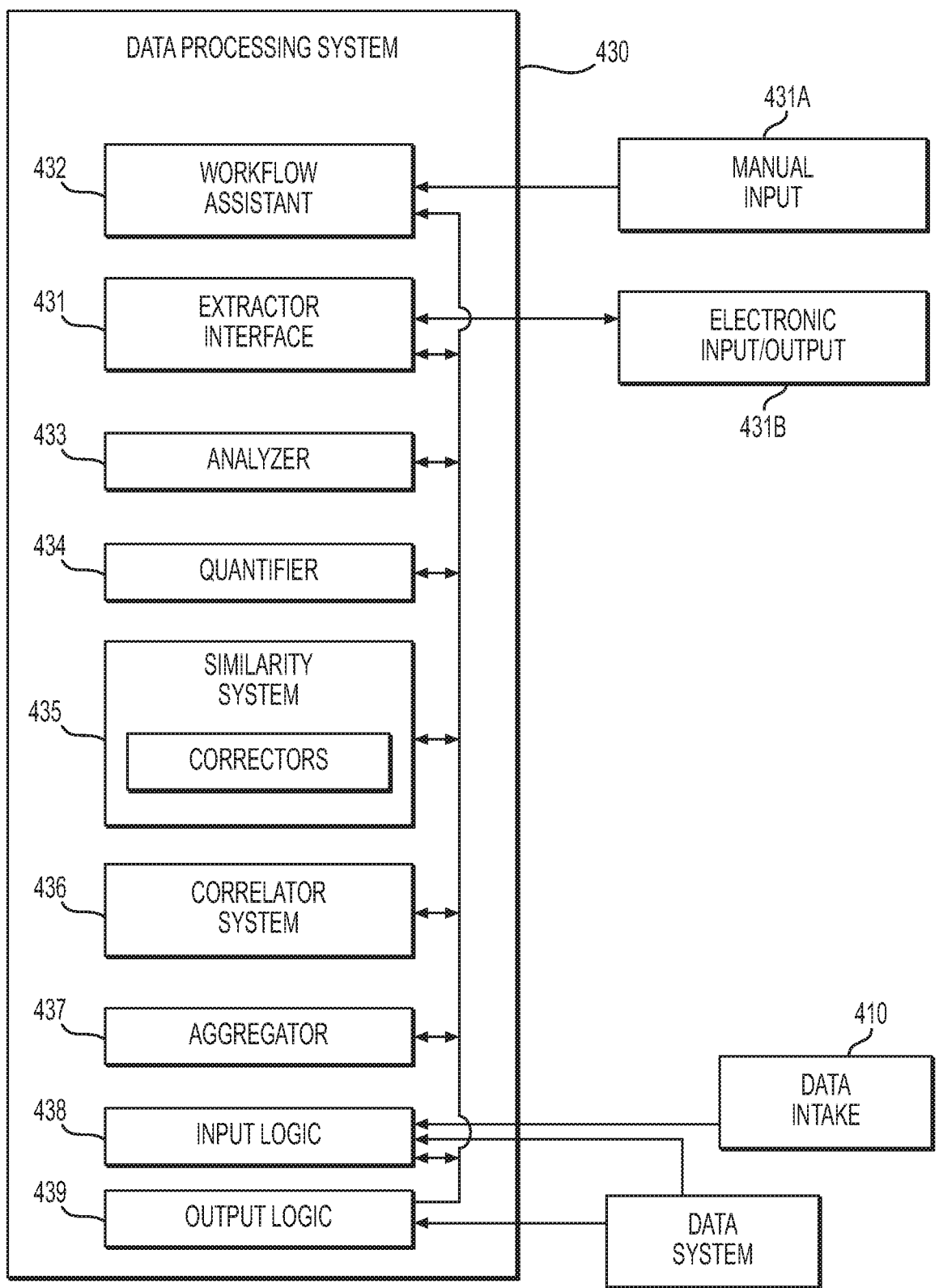

FIG. 4C illustrates an example data processing system 430. The system 430 includes input logic 438 that receives data and information from data intake system 410, which may include retrieving data from data system 330. Data processing system 430 includes workflow assistant 432 that may receive manual inputs from a human operator. The system 430 further includes extractor system 440 (described in more detail with reference to FIG. 4D) that identifies data elements within a data item, analyzer 433 that determines the relevance of the data elements in the context of the data item and consequent relevance of the data element and the data item to the runway in question (e.g., the runway 22), and quantifier 434 that determines any applicable importance and/or weighting to apply to the data elements and the data item. The system 430 still further includes similarity system 435 that generates similarity mechanisms that may be used to evaluate the similarity of runways so that "similar runways" may be used in the runway capacity forecast process. In an aspect, the similarity system 435 also may determine if a particular synonym might be equivalent to the data item. In another aspect, the similarity system 435 may identify runway that are similar to the runway of interest. In a further aspect, the similarity system 435 may generate a similarity matrix for one or more runways and corresponding data items, data elements in those data items, and values of the data elements, where the similarity matrix includes identities of similar runway-related features. In an aspect, the similarity system 435 may include data element and data item correctors that may make adjustments and corrections to the data elements and data items (e.g., correcting misspelled data elements and data items, making data elements and data items consistent with other data elements and data items). Yet further, the system 430 may include correlator system 436 that determines correlations between or among data elements derived from a data item; in an aspect, the correlation system 436 may indicate data elements that are repetitive. Further still, the system 430 includes aggregators 437 that group data elements, including grouping correlated data elements. In an aspect, to begin operation of the system 430, the workflow assistant 432 allows a human user to operate a manual input interface 431A to specify data elements, data items, and other information to operate the system 430. In another aspect, extractor system 440 receives a scan or other electronic input 431B of data elements and/or a data item, or a command to access data system 330 and selects, through output logic 439, data elements from the data item.

Figure 4D:
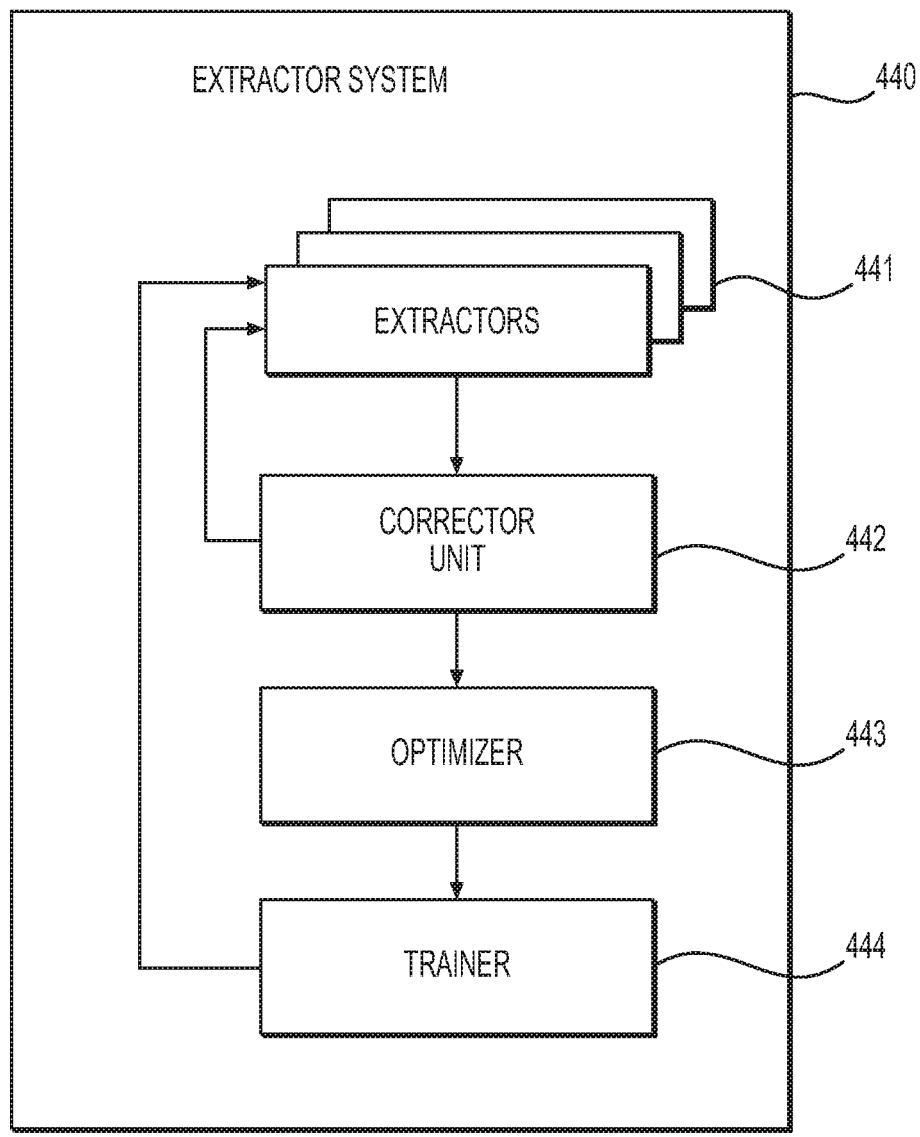

FIG. 4D shows the extractor system 440 in more detail. In FIG. 4D, extractor system 440 includes multiple extractors 441, some of which may be pre-defined to suit the runway of interest. Alternately, some or all extractors 441 may be trained using a training data set, or may be trained on the fly—that is, trained on actual data with metrics to determine the goodness of the training. The extractors 441 may include a wildcard feature to expand the set of data elements. The extractor system 440 further includes corrector unit 442 that cooperates with the extractors 441 to make corrections to data elements. When the corrector unit 442 corrects a data element, the prior and corrected data elements may be stored and/or self-referenced in the data system 330. The extractor system 440 further includes optimizer 443 that may be used to tune and refine the precision and recall of data element extraction by the extractors 441 (which is separate and distinct from training the extractors 441). For example, the optimizer 443 may execute various algorithms that recognize differences between and among a base word (i.e., a data element) and variations of the word (singular/plural, formal/colloquial) use of similes, hyperboles, alternate spelling, etc. In an aspect, the optimizer 443 may incorporate an electronic catalog of data elements and possible variations and alternate expressions, and a taxonomy of technical terms appropriate for the information source(s). Extractor system 440 includes trainer 444, which may be used to train and test extractors 441 against a sample of the target data. For example, when a text item including a related keyword is searched by Web crawler 421, runway capacity information may be generated such that a data table may show the number of occurrences of each keyword. In such a case, the searched texts are raw (and unstructured) data that correspond to runway capacity features before any processing by the data processing system 430. Furthermore, the data table may include the number of times a text item occurred for each keyword.

FIGS. 5A-5E illustrate example methods executed by the system of FIGS. 3B, 3D-3G, and 4A-4D. The methods are described for a hypothetical scenario in which traffic planners and ATC personnel responsible for runway 22 of airport 20 (FIG. 1B) are concerned that conditions at airport 20 are predicted to change or have changed to an extent that departure metering may be required. The conditions at airport 20 may be defined by a condition set F composed of a number of factors ($f_1, f_2, \ldots f_n$), each with a variable value. The effect of each factor on a measure of runway capacity, which in the example is inter-aircraft spacing $\bar{t}$ may be determined by an appropriate probability model. In the example, Bayesian model BN1 may be used to produce appropriate distributions. The probability model may determine the distribution based on one or any combination of factors $f_i$. In addition, the data system 330 may include a number of models for runways similar to runway 22. Furthermore, the condition set F may be sufficiently similar to an existing condition set G that use of the existing condition set G with BN1 would produce the same distribution as use of condition set F.

Figure 5A:
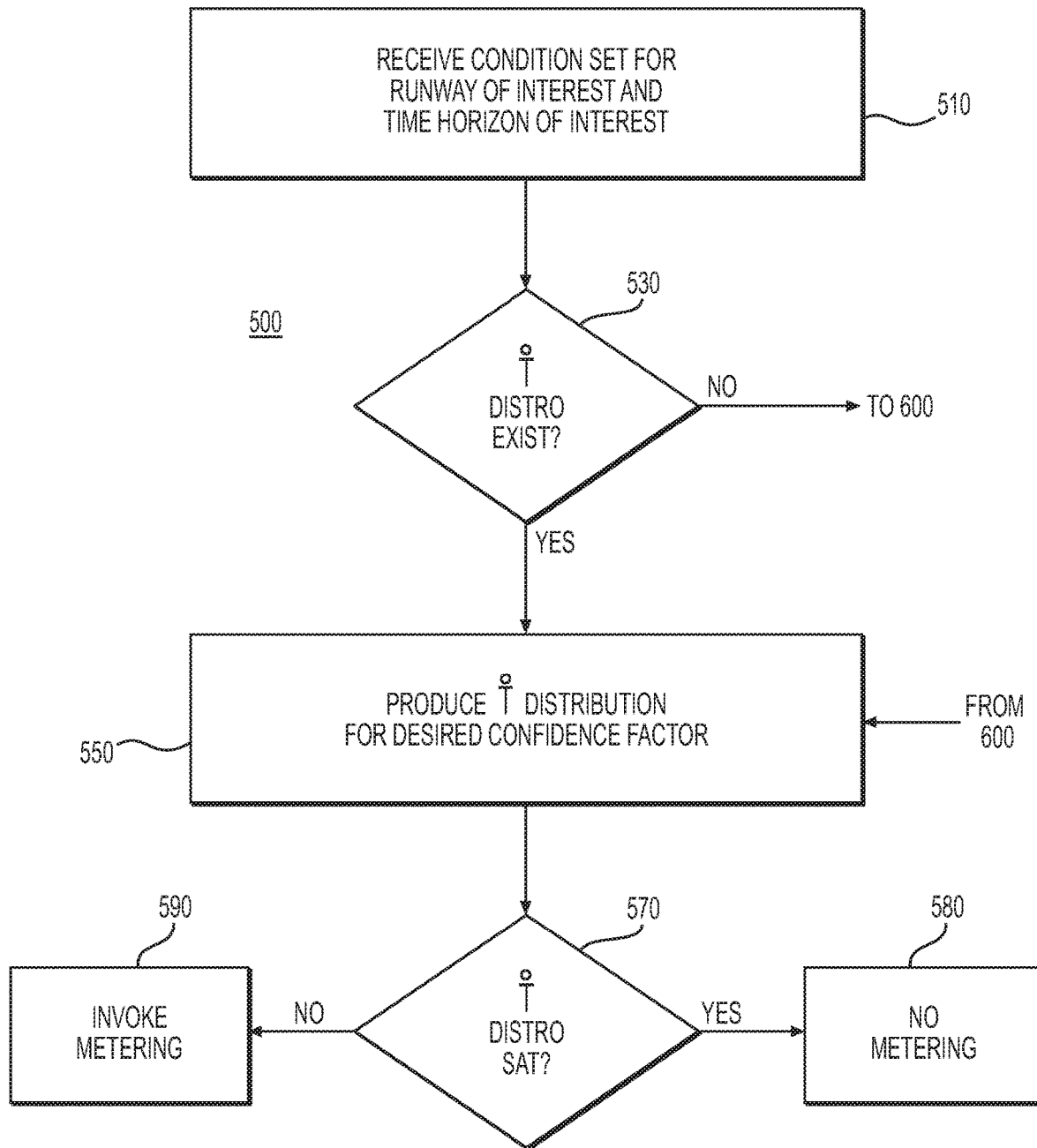

In FIG. 5A, method 500 begins in block 510 where the PARC system 300 (see FIG. 3B) operates to determine runway capacity for runways 21-24 (and in particular runway 22) (see FIG. 1B) by receiving a set of conditions (i.e., values for each of a set of variables $f_1, f_2, \ldots f_n$). In addition, the PARC system 300 receives an expected runway use schedule (arrivals and departures) for runway 22 at airport 20, for a specific time horizon T). The factors may be arranged in order of expected effect on $\bar{t}$. In block 530, the PARC system 300 determines if a distribution exists for $\bar{t}$ that closely conforms to actual conditions at airport 20, and more particularly the runway 22. For example, at airport 20, weather conditions may exist that dictate implementation of IFR, and parallel operation of runways 22 and 24 with a defined schedule of Heavy and Medium departures on both runways. The effect of these factor variables may already exist, as reflected in an existing, conforming distribution $\bar{t}$. That is, the runway 22 of airport 20 may already have been modeled using the condition set. If a conforming distribution does not exist, the method 500 moves to block 600. If a conforming distribution exists, the method 500 moves to block 550 and the PARC system 300 produces a series of $\bar{t}$ values versus confidence factor. In block 570, the PARC system 300 determines which, if any, of the $\bar{t}$ values result in an acceptable balance between runway demand D and the expected value of runway capacity C (as expressed by the single value $\bar{t}$). That is, the $\bar{t}$ value is such that departure metering is not needed. As part of this determination, the PARC system 300 accounts for the minimal separation criteria required or suggested by government agencies such as the FAA and/or non-government organizations such as the ICAO. Note that the PARC system 300 may be programmed to preclude generating $\bar{t}$ values that are less than the minimal separation criteria. In block 580, the PARC system 300 provides the conforming $\bar{t}$ values for display to traffic managers and other ATC personnel and systems. In block 590, the PARC system 300 indicates that no inter-aircraft spacing value will avoid demand D exceeding capacity C; i.e., as inter-aircraft spacing increases, demand D is more likely to exceed capacity C. The traffic managers/ATC personnel may use the provided $\bar{t}$ values to determine if demand D exceeds capacity C. Alternately, the PARC system 300 may provide an automated selection of one or more conforming $\bar{t}$ values.

FIG. 5B(1) illustrates operations of block 510 related to the collection, processing, and formatting of information and data used to forecast runway capacity and to perform various secondary analyses. Some or all of the operations of block 510 may occur continually, periodically, and automatically. In an aspect, the PARC system 300 operates as needed to update data, revise models, run simulations, and provide distributions of inter-aircraft spacing. The operations may be executed by the input module 342 and/or the information collection system 400. In FIG. 5B(1), operation 510a begins in block 511 when the components of the PARC processing system 320, including input module 342 and information collection system 400 execute to access information related to a runway of interest (runway 22) for a given time horizon T for use in runway capacity forecasting. The data and information may be accessed from data contained in data system 330 and from data available from the sources shown in FIG. 3A. One example source is SWIM data source 50 shown in FIG. 1C. The accessed data may include structured, semi-structured, and unstructured data. The accessed data may include data and information from big data sources and thus may constitute "big data." The unstructured data and information may include text and images. The semi-structured data may include posts, blogs, notices, emails, and similar data items. The structured data may include data from traditional databases or data structures using known database schemas such as relational databases. In some instances, the schema of the data or information source may be known by the input module 342. In other instances, the schema is not known by components of the PARC system 300, and in those instances, as part of the processes of block 511, the database qualifier 427 (FIG. 4B) executes to determine the database schema. Actual search of the data and information sources may be executed in block 511, using search engine 420, which may include Web crawler 421 and command line interface 423. The Web crawler 421 may search specific, known Web sites and may expand the list of Web sites based on results of information retrieved from the known Web sites. The search engine 420 may use command line interface 423 to search known databases. In addition to searching data and information sources, the subscription server 415 may receive push data and the streamer 422 may receive airport monitoring data in real time or near real time where such data is obtained from the airport of interest and is available to the PARC system 300. In block 513, the input module 342 identifies information and data relevant to, or possibly relevant to, a capacity estimation for the runway of interest, (i.e., the runway 22), the search engine 420 obtains the information and data and passes the information and data to the data processing system 430 along with information and data from the subscription server 415. Following block 513, the method 510a moves to block 514 and components of the PARC system 300 extract data elements from data items provided through the input module 342/information collection system 400, format the data elements, and store the formatted data elements for further processing and analysis. FIG. 5B(2) provides additional description of the block 514 extraction process. Following the process of block 514, the method 510a moves to block 515 and components of the PARC system 300 analyze and quantify the data items, define similar data elements and correlate the data elements where appropriate, and perform any appropriate aggregations to produce analyzable data of a form and format that may be efficiently and accurately analyzed in a runway forecast process and in secondary analysis processes. Following block 515, the method 510a moves to block 516 where the analyzable data is stored in an analyzable data structure (see data set 331B, FIG. 3E) for evaluation and analysis by the analytical components of the PARC system 300.

FIG. 5B(2) is a flowchart illustrating data element extraction method 510b. Method 510b begins in block 517 when one or more trained extractors 441 is applied to a set of data items collected by search engine 420 to identify data elements for analysis by the PARC system 300. The extractors 441 identify potentially relevant data elements in the collected data items. The extractors 441 may save the extracted data elements in, for example, data store 302. Following extraction and storage of the data elements, the method 510b moves to block 518 and the corrector unit 442, in cooperation with the extractors 441, makes appropriate corrections to the stored data elements. When the corrector unit 442 corrects a data element, the prior and corrected data elements may be stored and/or self-referenced in the data set. Following block 518, method 510b moves to block 519 and optimizer 443 executes to tune the extractors 441 based on the stored data elements. Following block 519, method 510b ends.

Figure 5C:
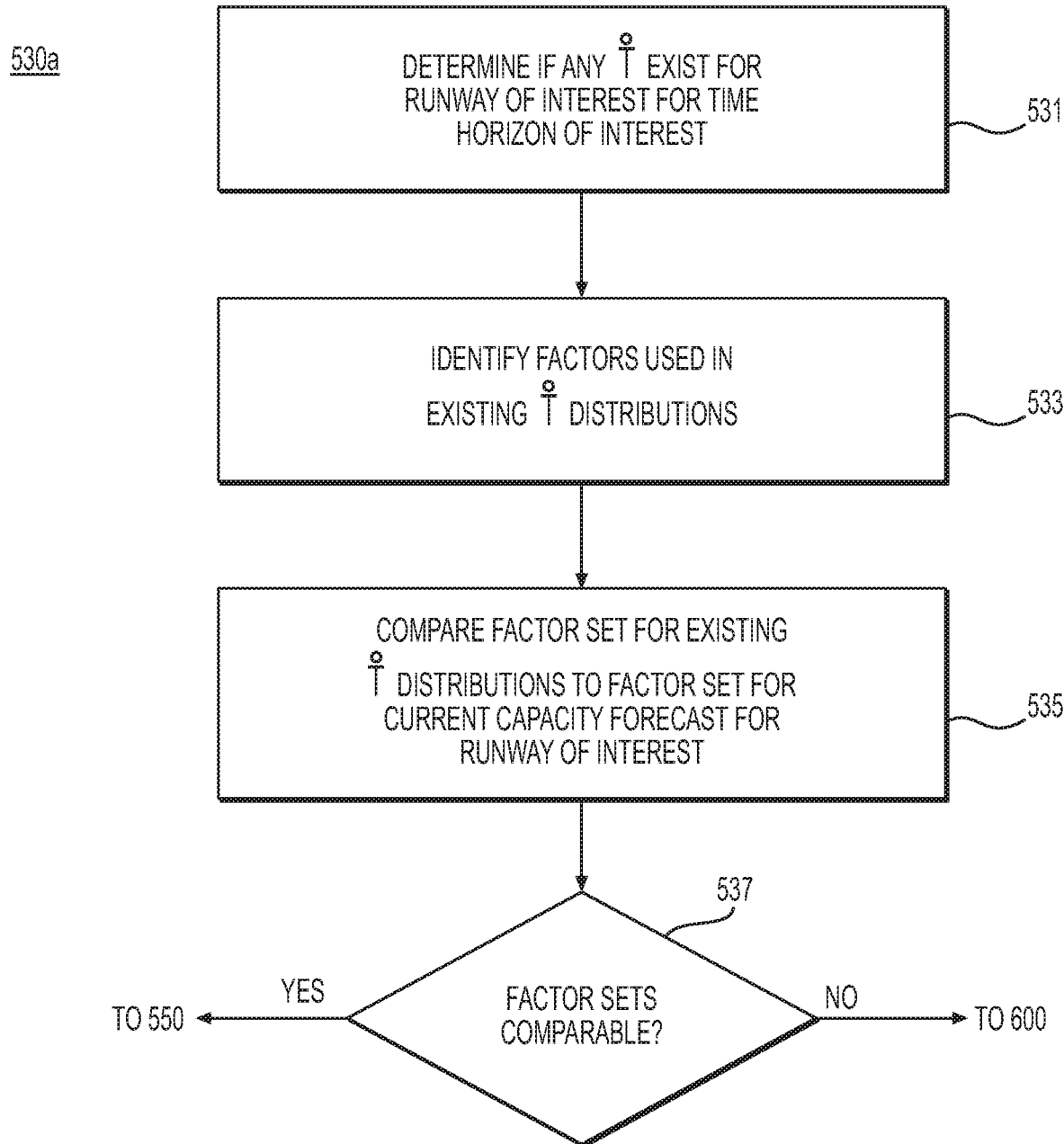

FIG. 5C illustrates operations of block 530 executed by the PARC system 300 to generate distributions of inter-aircraft spacing. In FIG. 5C, operation 530a begins in block 531 when the PARC system 300 determines if any $\bar{T}$ distributions exist for the runway of interest (runway 22) for a time horizon of interest. In block 533, the PARC system 300 identifies factors $f_i$ used to produce the existing $\bar{T}$ distribution. In block 535, the PARC system 300 compares the factor set used for the existing $\bar{T}$ distribution to the condition set, or factor set for the current capacity forecast for the runway of interest. In block 537, the PARC system 300 determines if the current condition, or factor, set is comparable to the existing factor set. Various criteria may be used in the comparison process of block 537. In block 537, if the factor sets are comparable, method 530a moves to block 550. If the factor sets are not comparable, the method 530a moves to block 600.

Figure 5D:
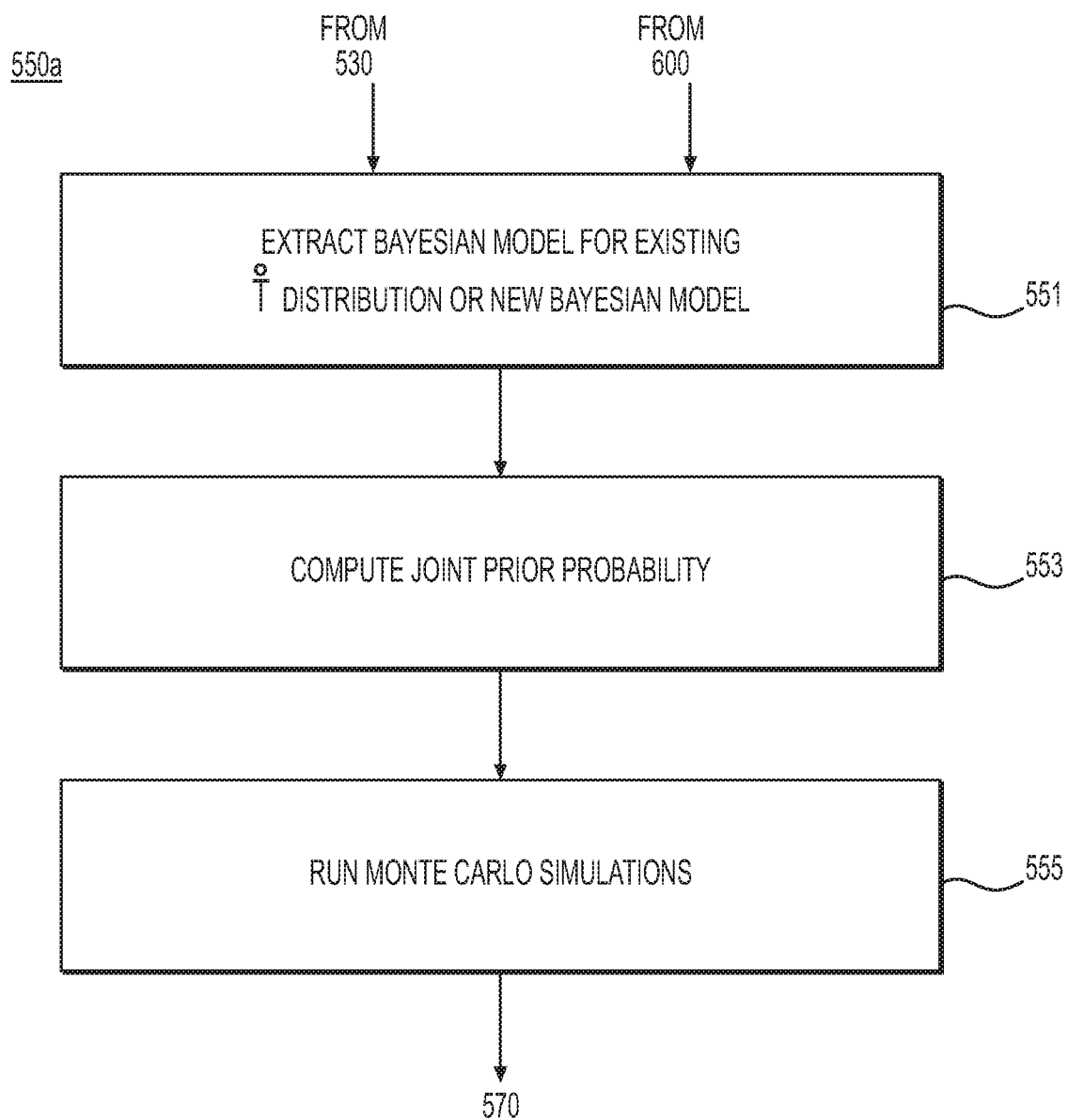

FIG. 5D illustrates operations of block 550 to produce distributions of inter-aircraft spacing. Operation 550a may follow either completion of block 530 or completion of block 600. In block 551, the PARC system 300 extracts the Bayesian model for the existing or newly created inter-aircraft spacing distribution. In block 553, the PARC system 300 computes the joint prior probability for the current condition or factor set. In block 555, the PARC system 300 runs Monte Carlo simulations. The operation 550a then moves to block 570.

Figure 5E:
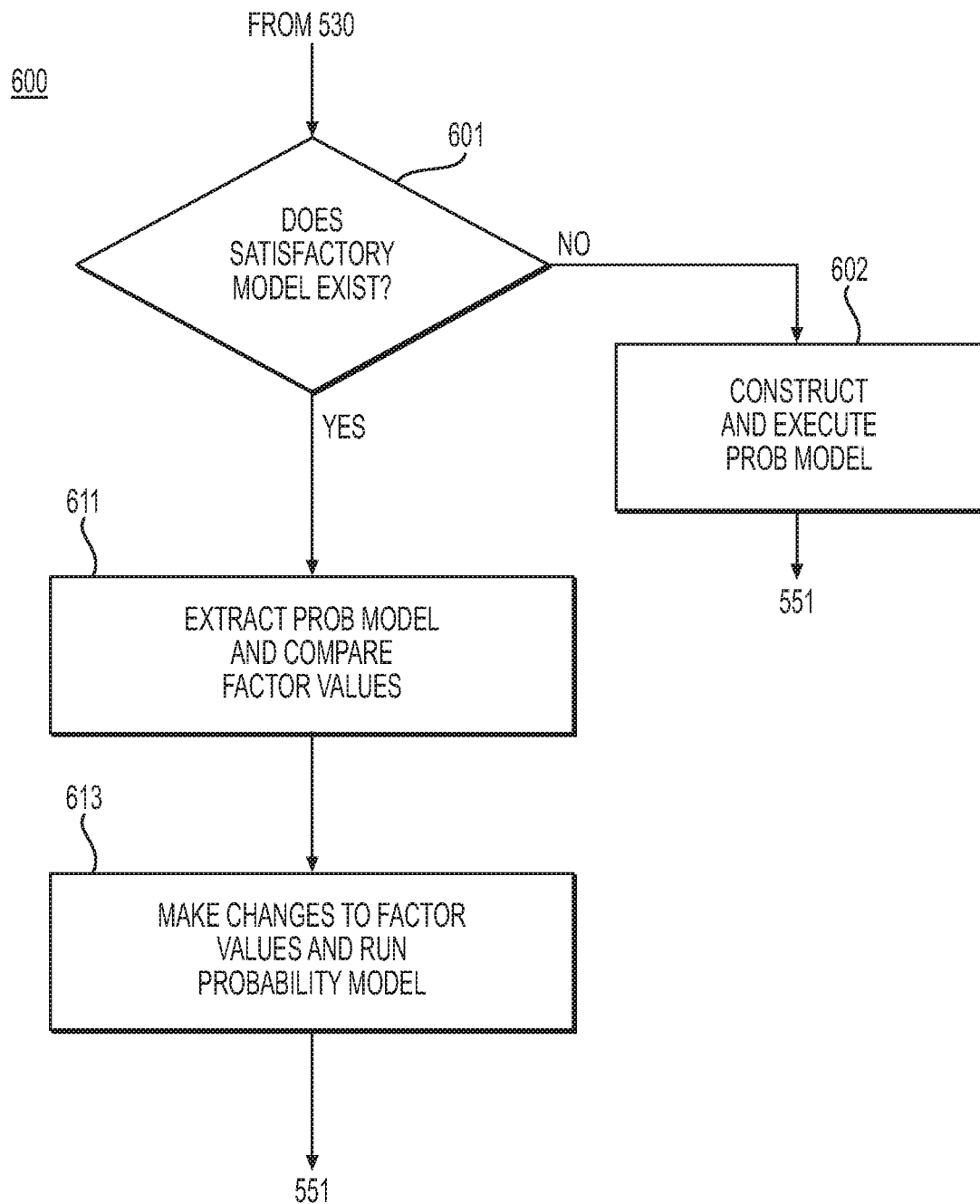

FIG. 5E illustrates operations of block 600. As noted with respect to FIG. 5A, a method of block 600 applies to the situations in which a conforming distribution of inter-aircraft spacing $\bar{T}$ is not available; in other words, either no distribution has ever been generated for the runway of interest with the specific factors for a time horizon of interest, or a distribution exists, but changes in factor variables suggest the distribution should be updated, or ATC personnel desire an update to the distribution. The method of block 600 begins in block 601 with the PARC system 300 determining if a satisfactory probability model exists to produce an estimate of inter-aircraft spacing based on a condition set produced as an aspect of block 510. For example, in block 601 the PARC system 300 may identify a prior probability model (for example, for a runway that is different from, but similar to runway 22) that includes all the factors present in the current condition set, even if the factor values differ between the current condition set and the set of factors used with the prior probability model. If a satisfactory probability model does not exist, the method of block 600 moves to block 602, where a probability model is constructed and executed. Following block 602, the method of block 600 returns to block 551. In block 601, if a satisfactory probability model exists, the method of block 600 moves to block 611. In block 611, the PARC system 300 extracts the probability model and compares the factor values used with the probability model to the current condition set. In block 613, the PARC system 300 makes changes to the factor values to correspond to the current condition set, and then reruns the probability computation. Following block 613, the method of block 600 returns to block 551.

Certain of the devices shown in FIGS. 3B, 3D-3G, and 4A-4D include a computing system. The computing system includes a processor (CPU) and a system bus that couples various system components including a system memory such as read only memory (ROM) and random-access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flowcharts and accompanying description to illustrate the embodiments represented in FIGS. 5A-5E. The disclosed devices, components, and systems contemplate using or implementing any suitable technique for performing the steps illustrated. Thus, FIGS. 5A-5E are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:
1. A method for safe and efficient use of airport runway capacity, comprising:
   receiving, by a processor of an air traffic control system at an airport:
      airport data related to movement areas of the airport,
      time data related to a time period,
      aircraft data related to a plurality of aircraft expected to operate into and out of the airport during the time period, and
      environmental data related to environmental conditions predicted for the airport during the time period;
   computing a probability distribution for inter-aircraft spacing by the processor comprising applying the airport data, the time data, the aircraft data, and the environmental data to a trained Bayesian network and producing the probability distribution for the inter-aircraft spacing as an output observation of the trained Bayesian network; and
   using the probability distribution and a confidence value, identifying an inter-aircraft spacing value for the plurality of aircraft expected to operate into and out of the airport during the time period.

2. The method of claim 1, further comprising:
   determining that the inter-aircraft spacing value fails to meet a minimum required inter-aircraft spacing value; and
   providing, by the processor, the inter-aircraft spacing value as an input to the air traffic control system for metering the plurality of aircraft arriving at and departing from the airport during the time period.

3. The method of claim 2, wherein the minimum required inter-aircraft spacing value comprises a minimum value for vortex effects, an excess spacing value for buffers, and a variable spacing value, and wherein the minimum required inter-aircraft spacing value varies as the minimum value for vortex effects varies and the variable spacing value varies.

4. The method of claim 3, wherein the variable spacing value accounts for an observed range of pilot-induced effects on inter-aircraft spacing.

5. The method of claim 1, further comprising:
   determining that the inter-aircraft spacing value exceeds a minimum required inter-aircraft spacing value; and
   providing, by the processor, the inter-aircraft spacing value as an input to the air traffic control system for aircraft arriving at and departing from the airport during the time period.

6. The method of claim 1, comprising:
receiving updated aircraft data for a remainder of the time period; and
using the updated aircraft data, computing a revised inter-aircraft spacing for the plurality of aircraft expected to operate out of and into the airport during the remainder of the time period.

7. The method of claim 1, comprising:
receiving updated environmental data for a remainder of the time period; and
using the updated environmental data, computing a revised inter-aircraft spacing for the plurality of aircraft expected to operate out of and into the airport during the remainder of the time period.

8. The method of claim 1, wherein the airport data comprise runway length and direction, a number of runways in operation, and arrival and departure routes available from the runways in operation during the time period, wherein the aircraft data comprise a number of expected aircraft arriving and departing during the time period, aircraft weight class and aircraft type for each arriving and departing aircraft during the time period, and wherein the environmental data comprise meteorological data including surface air temperature, ceiling, visibility, and wind speed and wind direction.

9. The method of claim 1, wherein the trained Bayesian network is trained using historical data including historical airport data, historical aircraft data for the airport, and historical meteorological data for the airport, the method further comprising periodically retraining and reverifying operation of the Bayesian network.

10. An air traffic control system for safe and efficient metering of aircraft arriving at and departing from an airport, comprising:
a processor;
one or more user interface displays; and
a non-transitory, computer-readable storage medium having encoded thereon, machine instructions executable by the processor, wherein the processor executes the machine instructions to:
receive:
airport data related to movement areas of the airport;
time data related to a time period of aircraft operations at the airport;
aircraft data related to a plurality of aircraft expected to operate into and out of the airport for the time period; and
environmental data related to environmental conditions predicted for the airport for the time period,
compute a probability distribution for inter-aircraft spacing by applying the airport data, the time data, the aircraft data, and the environmental data to a trained Bayesian network and producing the probability distribution for the inter-aircraft spacing as an output observation of the trained Bayesian network,
using the probability distribution and a confidence value, compute an inter-aircraft spacing value for the plurality of aircraft expected to operate into and out of the airport of interest during the time period,
compare the inter-aircraft spacing value to a minimum required inter-aircraft spacing value, and
provide the inter-aircraft spacing value:
for display on the user interface displays for the time period; and
as an input to the air traffic control system to meter the plurality of aircraft arriving at and departing from the airport for the time period.

11. The air traffic control system of claim 10, wherein the processor executes the machine instructions to:
receive updated aircraft data during a remainder of the time period; and
using the updated aircraft data, compute a revised inter-aircraft spacing for the plurality of aircraft expected to operate out of and into the airport during the remainder of the time period.

12. The air traffic control system of claim 10, wherein the processor executes the machine instructions to:
receive updated environmental data during a remainder of the time period; and
using the updated environmental data, compute a revised inter-aircraft spacing for the plurality of aircraft expected to operate out of and into the airport during the remainder of the time period.

13. The air traffic control system of claim 10, wherein the airport data comprise runway length and direction, a number of runways in operation, and arrival and departure routes available from the runways in operation during the time period, wherein the aircraft data comprise a number of expected aircraft arriving and departing during the time period, aircraft weight class and aircraft type for each arriving and departing aircraft during the time period, and wherein the environmental data comprise meteorological data including surface air temperature, ceiling, visibility, and wind speed and wind direction.

14. The air traffic control system of claim 10, wherein the minimum required inter-aircraft spacing comprises a minimum value for vortex effects, an excess spacing value for buffers, and a variable spacing value, and wherein the minimum required inter-aircraft spacing value varies as the minimum value for vortex effects varies and the variable spacing value varies.

15. A non-transitory, computer-readable storage medium having encoded thereon, machine instructions executable by a processor to implement an air traffic control system for safe and efficient metering of aircraft arriving at and departing from an airport, wherein the processor executes the machine instructions to:
receive a plurality of data types related to operation of a plurality of aircraft at the airport during a time period of aircraft operations at the airport;
generate a plurality of histograms, one histogram for each of the plurality of data types;
apply the plurality of histograms as an input to a trained Bayesian network and generate an observation on the Bayesian network as an output inter-aircraft spacing distribution;
receive a confidence level for the output inter-aircraft spacing distribution;
provide an inter-aircraft spacing value corresponding to the confidence level;
compare the inter-aircraft spacing value to a minimum required inter-aircraft spacing value; and
provide control instructions for metering arriving and departing aircraft based on the comparison.

16. The non-transitory, computer-readable storage medium of claim 15, wherein the plurality of data types comprise airport data related to movement areas of the airport; time data related to the time period of the aircraft operations at the airport; aircraft data related to a plurality of aircraft expected to operate into and out of the airport during the time period; and environmental data related to environmental conditions predicted for the airport during the time period.

17. The non-transitory, computer-readable storage medium of claim 16, wherein the airport data comprise runway length and direction, a number of runways in operation, and arrival and departure routes available from the runways in operation during the time period, wherein the aircraft data comprise a number of expected aircraft arriving and departing during the time period, and aircraft weight class and aircraft type for each arriving and departing aircraft during the time period, and wherein the environmental data comprise meteorological data including surface air temperature, ceiling, visibility, and wind speed and wind direction.

18. The non-transitory, computer-readable storage medium of claim 15, wherein the minimum required inter-aircraft spacing value comprises a minimum value for vortex effects, an excess spacing value for buffers, and a variable spacing value, and wherein the minimum required inter-aircraft spacing value varies as the minimum value for vortex effects varies and the variable spacing value varies.

19. The non-transitory, computer-readable storage medium of claim 18, wherein the variable spacing value accounts for pilot-induced spacing effects.

20. The non-transitory, computer-readable storage medium of claim 15, wherein the processor executes the machine instructions to:
   trigger time-based flow management (TBFM) and departure metering procedure (DMP) automation processes to schedule aircraft arrivals to and departures from the airport during the time period; and
   alert traffic management personnel to the TBFM and DMP automation processes.

* * * * *